United States Patent
Liu et al.

(10) Patent No.: US 12,493,774 B2
(45) Date of Patent: Dec. 9, 2025

(54) NEURAL NETWORK OPERATION MODULE AND METHOD

(71) Applicant: Shanghai Cambricon Information Technology Co., Ltd, Pudong New Area (CN)

(72) Inventors: Shaoli Liu, Pudong New Area (CN); Xishan Zhang, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 1109 days.

(21) Appl. No.: 17/440,479

(22) PCT Filed: Mar. 20, 2020

(86) PCT No.: PCT/CN2020/080402
§ 371 (c)(1),
(2) Date: Sep. 17, 2021

(87) PCT Pub. No.: WO2020/192582
PCT Pub. Date: Oct. 1, 2020

(65) Prior Publication Data
US 2022/0156562 A1    May 19, 2022

(30) Foreign Application Priority Data

Mar. 26, 2019  (CN) .......................... 201910235038.X
Mar. 26, 2019  (CN) .......................... 201910235214.X
Mar. 26, 2019  (CN) .......................... 201910235215.4

(51) Int. Cl.
*G06N 3/047*    (2023.01)
(52) U.S. Cl.
CPC ..................... *G06N 3/047* (2023.01)
(58) Field of Classification Search
CPC .................................................. G06N 3/047
(Continued)

(56) References Cited

U.S. PATENT DOCUMENTS

2012/0069036 A1* 3/2012 Dharmapurikar ..... G06T 15/005
                                                                345/522
2018/0268283 A1    9/2018 Gilad-Bachrach et al.
(Continued)

FOREIGN PATENT DOCUMENTS

CN        107301454 A      10/2017
CN        108510055 A  *   9/2018  ............. G06N 3/088
(Continued)

OTHER PUBLICATIONS

CN201910235215.4—Second Office Actin mailed on Dec. 20, 2023, 8 pages.
(Continued)

*Primary Examiner* — Vincent Gonzales
*Assistant Examiner* — Em N Trieu
(74) *Attorney, Agent, or Firm* — Getech Law LLC; Jun Ye

(57) ABSTRACT

A neural network operation module, which comprises a storage unit that stores output neurons, weight precision and output neuron gradient precision of a multi-layer neural network; a controller unit that obtains an average value Y1 of the absolute value of the output neuron before fixed-point and an average value Y2 of the absolute value of the output neuron after fixed-point; if Y1/Y2 is greater than a preset threshold K, obtaining the output neuron gradient precision of adjacent two layers of the multi-layer neural network, and obtaining an estimation value A″ of error transfer precision; when A″ is greater than a preset precision $A_r$, the output neuron gradient precision and weight precision of the adjacent two layers are increased; and an operation unit that represents the output neuron gradient and weight of the adjacent two layers according to the increased precision.

18 Claims, 4 Drawing Sheets

(58) Field of Classification Search
USPC .......................................................... 706/15
See application file for complete search history.

(56) References Cited

U.S. PATENT DOCUMENTS

2018/0300855 A1* 10/2018 Tang ..................... G06T 3/4053
2019/0095819 A1* 3/2019 Varadarajan ............ G06F 9/505

FOREIGN PATENT DOCUMENTS

| CN | 109376861 A | | 2/2019 | |
|---|---|---|---|---|
| CN | 110870020 A | * | 3/2020 | ............. G06N 3/084 |
| CN | 110880037 A | | 3/2020 | |
| CN | 111291878 A | * | 6/2020 | ............. G06N 3/063 |
| CN | 111831358 B | | 4/2023 | |
| WO | WO-2018217563 A1 | * | 11/2018 | ............. G06N 3/045 |

OTHER PUBLICATIONS

PCT/CN2020/080402—International Search Report, mailed Jun. 19, 2020, 4 pages.
Seyed Hamed Fatemi Langroudi, et al., "Deep Learning Inference on Embedded Devices: Fixed-Point vs Posit"., 2018 1st Workshop on Energy Efficient Machine Learning and Cognitive Computing for Embedded Applications (EMC2), Mar. 25, 2018, 5 pages.
CN201910235038.X—First Office Action mailed on Jun. 27, 2023, 3 pages. (With Brief English Explanation).
CN201910235214.X—First Office Action mailed on Jun. 29, 2023, 3 pages. (With Brief English Explanation).

* cited by examiner

`US 12,493,774 B2`

NEURAL NETWORK OPERATION MODULE AND METHOD

CROSS REFERENCE TO RELATED APPLICATIONS

This application is a 371 of International Application No. PCT/CN2020/080402, filed Mar. 20, 2020, which claims priority to foreign applications, Chinese Application No. CN201910235215.4, filed Mar. 26, 2019, Chinese Application No. CN201910235038.X, filed Mar. 26, 2019, and Chinese Application No. CN201910235214.X, filed Mar. 26, 2019. The contents of each of the above-captioned patent applications are hereby expressly incorporated herein by reference in their entireties.

TECHNICAL FIELD

The present disclosure relates to the field of neural networks, and in particular to a neural network operation module and method.

BACKGROUND

The fixed-point number is a data format that can specify the position of a decimal point. Bit width is often used to represent the data length of a fixed-point number. For example, the bit width of a 16-bit fixed-point number is 16. For a fixed-point number with a given bit width, representable data precision and representable numerical range are negatively correlated. If the representable precision is greater, the representable numerical range is smaller. For a fixed-point number with a bit width of bitnum, where the fixed-point number is a signed number, the first bit is a sign bit; if the maximum fixed-point precision is $2^s$ and the range that this fixed-point representation manner can represent is [neg, pos], where $pos=(2^{bitnum-1}-1)*2^s$ and $neg=-(2^{bitnum-1}-1)*2^s$.

In neural network operations, fixed-point numbers can be used to represent and operate data. For example, in the process of forward operation, data of an $L^{th}$ layer includes an input neuron $X^{(1)}$, an output neuron $Y^{(1)}$, and a weight $W^{(1)}$. For example, in the process of backward operation, data of an $L^{th}$ layer includes an input neuron gradient $\nabla_X^{(1)}$, an output neuron gradient $\nabla_Y^{(1)}$, and a weight gradient $\nabla_w^{(1)}$. All the above data can be represented or operated by fixed-point numbers.

The training process of a neural network usually includes two steps: a forward operation and a backward operation. In the backward operation, the precision required for the input neuron gradient, the weight gradient, and the output neuron gradient may change, such as increasing with the training process. If the precision of the fixed-point number is not high enough, a large error may occur in the operation result, which may even cause failure of training.

SUMMARY

The technical problem to be solved by the embodiments of the present disclosure is that, in the neural network operation process, the precision of input neurons, weights, or output neuron gradients is not high enough, thus resulting in the error in operation or training results. The embodiments of the present disclosure provide a neural network operation module and method to dynamically adjust the precision of input neurons, weights, and output neuron gradients, so as to reduce the error of operation or training results.

In a first aspect, the present disclosure provides a neural network operation module configured to perform a multi-layer neural network operation. The operation module includes:

a storage unit configured to store a weight precision and an output neuron gradient precision of the multi-layer neural network;

a controller unit configured to obtain an output neuron gradient precision and a weight precision $S_w$ of two adjacent layers of the multi-layer neural network from the storage unit, determine an estimated value $A^n$ of a target error transfer precision according to the output neuron gradient precision and weight precision $S_w$ of two adjacent layers, and when the estimated value $A^n$ of the target error transfer precision is less than a preset precision $A_r$, reduce the output neuron gradient precision and weight precision $S_w$ of two adjacent layers; and an operation unit configured to represent the output neuron gradient of two adjacent layers according to the reduced gradient precision of the output neurons of the adjacent two layers, represent the weight of the multi-layer neural network according to the reduced weight precision $S_w$, and perform subsequent operations.

In a feasible embodiment, the output neuron gradient precision of two adjacent layers includes an output neuron gradient precision $S\nabla_{x(L-1)}$ of an $L-1^{th}$ layer and an output neuron gradient precision $S\nabla_{x(L)}$ of an $L^{th}$ layer. In terms of determining an estimated value of target error transfer precision according to the output neuron gradient precision and the weight precision of two adjacent layers, the controller unit is specifically configured to:

if the output neuron gradient precision $S\nabla_{x(L-1)}$ of the $L-1^{th}$ layer includes a plurality of output neuron gradient precisions, obtain a plurality of estimated values of the error transfer precision according to the plurality of output neuron gradient precisions of the $L-1^{th}$ layer, the weight precision $S_w$, and the output neuron gradient precision $S\nabla_{x(L)}$ of the $L^{th}$ layer; if the output neuron gradient precision $S\nabla_{x(L)}$ of the $L^{th}$ layer includes a plurality of output neuron gradient precisions, obtain a plurality of estimated values of the error transfer precision according to the plurality of output neuron gradient precisions of the $L^{th}$ layer, the weight precision $S_w$, and the output neuron gradient precision $S\nabla_{x(L)}$ of the $L^{th}$ layer; where L is an integer greater than 1; and select the estimated value $A^n$ of the target error transfer precision from the plurality of estimated values of error transfer precision according to a preset strategy.

In a feasible embodiment, the controller unit obtaining a plurality of estimated values of the error transfer precision according to the plurality of output neuron gradient precision of the $L-1^{th}$ layer, the weight precision $S_w$, and the output neuron gradient precision $S\nabla_{x(L)}$ of the $L^{th}$ layer includes:

calculating, by the controller unit, the plurality of output neuron gradient precision of the $L-1^{th}$ layer, the weight precision $S_w$, and the output neuron gradient precision $S\nabla_{x(L)}$ of the $L^{th}$ layer according to a first preset formula to obtain the plurality of estimated values of error transfer precision, where the first preset formula is: $A^i = S\nabla_{x(L)} + S_w - S^i\nabla_{x(L-1)}$, $A^i$ is an $i^{th}$ estimated value of error transfer precision, and the $S^i\nabla_{x(L-1)}$ is an $i^{th}$ output neuron of the $L-1^{th}$ layer.

In a feasible embodiment, the controller unit obtaining a plurality of estimated values of the error transfer precision according to the output neuron gradient precision $S\nabla_{x(l-1)}$ of the L-1$^{th}$ layer, the weight precision $S_w$, and the plurality of output neuron gradient precisions of the L$^{th}$ layer includes:

calculating, by the controller unit, the output neuron gradient precision $S\nabla_{x(l-1)}$ of the L-1$^{th}$ layer, the weight precision $S_w$, and the plurality of output neuron gradient precisions of the L$^{th}$ layer according to a second preset formula to obtain the plurality of estimated values of the error transfer precision, where the second preset formula is: $A_i = S^i\nabla_{x(l)} + S_w - S\nabla_{x(l-1)}$, the $A^i$ is an i$^{th}$ estimated value of error transfer precision, and the $S^i\nabla_{x(l-1)}$ is an i$^{th}$ output neuron of the L-1$^{th}$ layer.

In a feasible embodiment, the controller unit selecting the estimated value $A''$ of target error transfer precision from the plurality of estimated values of the error transfer precision according to a preset strategy includes:

selecting any one of the plurality of estimated values of the error transfer precision as the estimated value $A''$ of target error transfer precision; or selecting a maximum value from the plurality of estimated values of the error transfer precision as the estimated value $A''$ of target error transfer precision; or selecting a minimum value from the plurality of estimated values of the error transfer precision as the estimated value $A''$ of target error transfer precision; or calculating a mean value of the plurality of estimated values of the error transfer precision as the estimated value $A''$ of target error transfer precision; or calculating a weighted mean value of the plurality of estimated values of the error transfer precision according to a preset weight as the estimated value $A''$ of target error transfer precision.

In a feasible embodiment, the controller unit reducing the output neuron gradient precision of two adjacent layers includes: reducing the output neuron gradient precision $S\nabla_{x(l-1)}$ of the L-1$^{th}$ layer and the output neuron gradient precision $S\nabla_{x(l)}$ of the L$^{th}$ layer.

In a feasible embodiment, when the controller unit reduces the plurality of output neuron gradient precisions $S\nabla_{x(l-1)}$ of the L-1$^{th}$ layer, the controller unit further increases a bit width of a current fixed-point data format representing the output neuron gradient of the L-1$^{th}$ layer;

when the controller unit reduces the weight precision $S_w$, the controller unit further increases a bit width of a current fixed-point data format representing the weight;

when the controller unit reduces the output neuron gradient precision $S\nabla_{x(l)}$ of the L$^{th}$ layer, the controller unit further increases a bit width of a current fixed-point data format representing the output neuron gradient of the L$^{th}$ layer.

In a feasible embodiment, the controller unit increasing a bit width of current fixed-point data format representing the output neuron gradient of the L$^{th}$ layer includes:

increasing, by the controller unit, a bit width of a current fixed-point data format representing the output neuron gradient of the L$^{th}$ layer according to an absolute value of $A''-A_r$ and a first preset stride N1; or increasing, by the controller unit, a bit width of a current fixed-point data format representing the output neuron gradient of the L$^{th}$ layer in a double decreasing manner; or increasing, by the controller unit, a bit width of a current fixed-point data format representing the output neuron gradient of the L$^{th}$ layer according to a second preset stride N2.

In a feasible embodiment, the controller unit increasing a bit width of a current fixed-point data format representing the weight includes:

increasing, by the controller unit, a bit width of a current fixed-point data format representing the weight according to an absolute value of $A''-A_r$ and a third preset stride N3; or increasing, by the controller unit, a bit width of a current fixed-point data format representing the weight in a double decreasing manner; or increasing, by the controller unit, a bit width of a current fixed-point data format representing the weight according to the second preset stride N2.

In a feasible embodiment, the controller unit increasing a bit width of a current fixed-point data format representing the output neuron gradient of the L-1$^{th}$ layer includes:

increasing, by the controller unit, a bit width of a current fixed-point data format representing the output neuron gradient of the L-1$^{th}$ layer according to an absolute value of $A''-A_r$ and a fourth preset stride N4; or increasing, by the controller unit, a bit width of a current fixed-point data format representing the output neuron gradient of the L-1$^{th}$ layer in a double decreasing manner; or increasing, by the controller unit, a bit width of a current fixed-point data format representing the output neuron gradient of the L-1$^{th}$ layer according to the second preset stride N2.

In a feasible embodiment, the second preset stride N2 is proportional to the preset threshold.

In a feasible embodiment, the controller unit is further configured to:

preset the preset precision $A_r$ according to an empirical value; or obtain the preset precision $A_r$ which matches the input parameter by changing an input parameter; or obtain the preset precision $A_r$ through machine learning; or set the preset precision $A_r$ according to an amount of output neurons of the L-1$^{th}$ layer, where the greater the amount of output neurons of the L-1$^{th}$ layer is, the higher the preset precision $A_r$ is.

In a second aspect, the present disclosure provides a neural network operation module configured to perform a multi-layer neural network operation. The operation module includes:

a controller unit configured to obtain an output neuron of a multi-layer neural network from a storage unit and determine a mean value Y1 of an absolute value of the output neuron; represent the output neuron in a fixed-point data format to obtain a fixed-point output neuron; determine a mean value Y2 of the absolute value of the fixed-point output neuron; if Y1/Y2 is greater than a preset threshold K, the controller unit is configured to execute part or all of the steps performed by the controller unit of the first aspect; and an operation unit configured to execute part or all of the steps performed by the operation unit of the first aspect.

In a third aspect, the present disclosure provides a neural network operation method to perform a multi-layer neural network operation. The method may include:

obtaining an output neuron gradient precision and a weight precision $S_w$ of two adjacent layers of the multi-layer neural network, determining an estimated value $A''$ of a target error transfer precision according to the output neuron gradient precision and the weight precision $S_w$ of two adjacent layers, and when the estimated value $A''$ of the target error transfer precision is less than a preset precision $A_r$, reducing the output neuron gradient precision and the weight precision $S_w$ of two adjacent layers;

representing the output neuron gradient of two adjacent layers according to the reduced gradient precision of the output neurons of the adjacent two layers, representing the weight of the multi-layer neural network according to the reduced weight precision $S_w$, and performing subsequent operations.

In a feasible embodiment, the output neuron gradient precision of two adjacent layers includes an output neuron gradient precision $S\nabla_{x(L-1)}$ of an $L-1^{th}$ layer and an output neuron gradient precision $S\nabla_{x(L)}$ of an $L^{th}$ layer. The determining an estimated value of a target error transfer precision according to the output neuron gradient precision and the weight precision of two adjacent layers includes:

if the output neuron gradient precision $S\nabla_{x(L-1)}$ of the $L-1^{th}$ layer includes a plurality of output neuron gradient precisions, obtaining a plurality of estimated values of the error transfer precision according to the plurality of output neuron gradient precision of the $L-1^{th}$ layer, the weight precision $S_w$, and the output neuron gradient precision $S\nabla_{x(L)}$ of the $L^{th}$ layer; if the output neuron gradient precision $S\nabla_{x(L)}$ of the $L^{th}$ layer includes a plurality of output neuron gradient precisions, obtaining a plurality of estimated values of the error transfer precision according to the plurality of output neuron gradient precisions of the $L^{th}$ layer, the weight precision $S_w$, and the output neuron gradient precision $S\nabla_{x(L)}$ of the $L^{th}$ layer, where L is an integer greater than 1; and selecting the estimated value $A''$ of the target error transfer precision from the plurality of estimated values of error transfer precision according to a preset strategy.

In a feasible embodiment, the obtaining a plurality of estimated values of the error transfer precision according to the plurality of output neuron gradient precisions of the $L-1^{th}$ layer, the weight precision $S_w$, and the output neuron gradient precision $S\nabla_{x(L)}$ of the $L^{th}$ layer includes:

calculating the plurality of output neuron gradient precisions of the $L-1^{th}$ layer, the weight precision $S_w$, and the output neuron gradient precision $S\nabla_{x(L)}$ of the $L^{th}$ layer according to a first preset formula to obtain the plurality of estimated values of the error transfer precision, where the first preset formula is: $A^i = S\nabla_{x(L)} + S_w - S^i\nabla_{x(L-1)}$, $A^i$ is an $i^{th}$ estimated value of error transfer precision, and the $S^i\nabla_{x(L-1)}$ is an $i^{th}$ output neuron of the $L-1^{th}$ layer.

In a feasible embodiment, the obtaining a plurality of estimated values of error transfer precision according to the output neuron gradient precision $S\nabla_{x(L-1)}$ of the $L-1^{th}$ layer, the weight precision $S_w$, and the plurality of output neuron gradient precisions of the $L^{th}$ layer includes:

calculating the output neuron gradient precision $S\nabla_{x(L-1)}$ of the $L-1^{th}$ layer, the weight precision $S_w$, and the plurality of output neuron gradient precisions of the $L^{th}$ layer according to a second preset formula to obtain the plurality of estimated values of error transfer precision, where the second preset formula is: $A_i = S^i\nabla_{x(L)} + S_w - S\nabla_{x(L-1)}$, the $A^i$ is an $i^{th}$ estimated value of error transfer precision, and the $S^i\nabla_{x(L)}$ is an $i^{th}$ output neuron of the $L-1^{th}$ layer.

In a feasible embodiment, the selecting the estimated value $A''$ of the target error transfer precision from the plurality of estimated values of the error transfer precision according to a preset strategy includes:

selecting any one of the plurality of estimated values of the error transfer precision as the estimated value $A''$ of the target error transfer precision; or selecting a maximum value from the plurality of estimated values of the error transfer precision as the estimated value $A''$ of the target error transfer precision; or selecting a minimum value from the plurality of estimated values of the error transfer precision as the estimated value $A''$ of the target error transfer precision; or calculating a mean value of the plurality of estimated values of the error transfer precision as the estimated value $A''$ of the target error transfer precision; or calculating a weighted mean value of the plurality of estimated values of the error transfer precision according to a preset weight as the estimated value $A''$ of target error transfer precision.

In a feasible embodiment, the reducing the output neuron gradient precision of two adjacent layers includes: reducing the output neuron gradient precision $S\nabla_{x(L-1)}$ of the $L-1^{th}$ layer and the output neuron gradient precision $S\nabla_{x(L)}$ of the $L^{th}$ layer.

In a feasible embodiment, the method further includes: when the controller unit reduces the plurality of output neuron gradient precisions $S\nabla_{x(L-1)}$ of the $L-1^{th}$ layer, increasing a bit width of a current fixed-point data format representing the output neuron gradient of the $L-1^{th}$ layer;

when the controller unit reduces the weight precision $S_w$, increasing a bit width of a current fixed-point data format representing the weight; and when the controller unit reduces the output neuron gradient precision $S\nabla_{x(L)}$ of the $L^{th}$ layer, increasing a bit width of a current fixed-point data format representing the output neuron gradient of the $L^{th}$ layer.

In a feasible embodiment, the increasing a bit width of current fixed-point data format representing the output neuron gradient of the $L^{th}$ layer includes:

increasing a bit width of a current fixed-point data format representing the output neuron gradient of the $L^{th}$ layer according to an absolute value of $A''-A_r$ and a first preset stride N1; or increasing a bit width of a current fixed-point data format representing the output neuron gradient of the $L^{th}$ layer in a double decreasing manner; or increasing a bit width of a current fixed-point data format representing the output neuron gradient of the $L^{th}$ layer according to a second preset stride N2.

In a feasible embodiment, the increasing the weight precision $S_w$ includes:

increasing a bit width of a current fixed-point data format representing the weight according to the absolute value of $A''-A_r$ and the first preset stride N2; or increasing a bit width of a current fixed-point data format representing the weight in a double decreasing manner; or increasing a bit width of a current fixed-point data format representing the weight according to the second preset stride N2.

In a feasible embodiment, the increasing a bit width of current fixed-point data format representing the output neuron gradient $S\nabla_{x(L)}$ of the $L-1^{th}$ layer includes:

increasing a bit width of a current fixed-point data format representing the output neuron gradient of the $L-1^{th}$ layer according to the absolute value of $A''-A_r$ and a third preset stride N3; or increasing a bit width of a current fixed-point data format representing the output neuron gradient of the $L-1^{th}$ layer in a double decreasing manner; or increasing a bit width of a current fixed-point data format representing the output neuron gradient of the L-1$^{th}$ layer according to the second preset stride N2.

In a feasible embodiment, the second preset stride N2 is proportional to the preset threshold.

In a feasible implementation, the method further includes:
presetting the preset precision A$_r$ according to an empirical value; or
obtaining the preset precision A$_r$ which matches the input parameter by changing an input parameter; or
obtaining the preset precision A$_r$ through machine learning; or
setting the preset precision A$_r$ according to an amount of output neurons of the L-1$^{th}$ layer, where the greater the amount of output neurons of the L-1$^{th}$ layer is, the higher the preset precision A$_r$ is.

In a fourth aspect, the present disclosure provides a neural network operation method to perform a multi-layer neural network operation. The method may include:
obtaining an output neuron of the multi-layer neural network and determining a mean value Y1 of an absolute value of the output neuron; representing the output neuron in a fixed-point data format to obtain a fixed-point output neuron; determining a mean value Y2 of the absolute value of the fixed-point output neuron; and if the Y1/Y2 is greater than the preset threshold K, executing part or all of the method of the third aspect.

BRIEF DESCRIPTION OF THE DRAWINGS

In order to illustrate the technical solutions in the embodiments of the present disclosure or the prior art more clearly, the drawings to be used in the description of the embodiments or the prior art are briefly explained below. Obviously, the drawings in the description below are merely some examples of the present disclosure. Other drawings can be obtained according to the disclosed drawings without any creative effort by those skilled in the art.

DETAILED DESCRIPTION OF THE EMBODIMENTS

Technical solutions in embodiments of the present disclosure will be described clearly and completely hereinafter with reference to the accompanied drawings in the embodiments of the present disclosure. Obviously, the embodiments to be described are merely some rather than all embodiments of the present disclosure. All other examples obtained by those of ordinary skill in the art based on the examples of the present disclosure without creative efforts shall fall within the protection scope of the present disclosure.

It should also be understood that the terms used in the specification of the present disclosure are for the purpose of describing particular embodiments only and are not intended to limit the disclosure. The singular forms "a" and "the" used in the embodiments of the present disclosure and the appended claims are also intended to include plural forms, unless the context clearly indicates other meanings. It should also be understood that the term "and/or" as used herein refers to and includes any or all possible combinations of one or more associated listed items.

In the process of neural network operation, the input neuron precision, weight precision, or output neuron gradient precision is not high enough, which leads to errors in the operation or training results.

In order to solve the above problem, the following technical solutions are provided.

In the process of neural network operation, due to a series of calculations such as addition, subtraction, multiplication, division, and convolution, input neurons, weights, and output neurons included in a forward operation process as well as input neuron gradients and weight gradients, and output neuron gradients included in a training process also change. The precision of input neurons, weights, output neurons, input neuron gradients, weight gradients, and output neuron gradients, represented in a fixed-point data format, may be required to increase or decrease. If the precision of input neurons, weights, output neurons, input neuron gradients, weight gradients, and output neuron gradients is not high enough, large errors may occur in the operation results, which may lead to failure of training; if the precision of input neurons, weights, output neurons, input neuron gradients, weight gradients, and output neuron gradients is redundant, unnecessary operation overhead may increase, which may waste operation resources. The present disclosure provides a neural network operation module and method to dynamically adjust the precision of the above data during the process of neural network operation. In this way, operation requirements may be satisfied, errors of operation results and operation overhead may be reduced, thus saving operation resources.

In the embodiment of the present disclosure, data precision is adjusted by adjusting the bit width of the above data.

Figure 1:
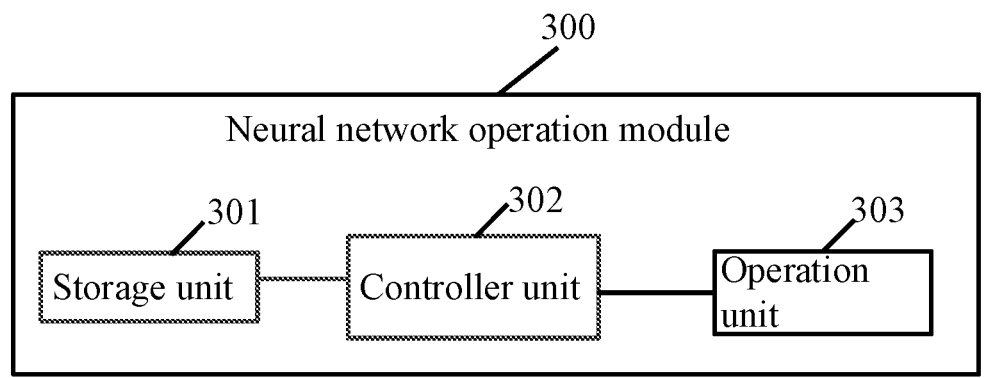
FIG. 1 is a structural diagram of a neural network operation module according to an embodiment of the present disclosure.

FIG. 1 is a structural diagram of a neural network operation module according to an embodiment of the present disclosure. The neural network operation module is configured to perform a multi-layer neural network operation. As shown in FIG. 1, the neural network operation module includes:
a storage unit 301 configured to store output neuron gradient precision and weight precision;
a controller unit 302 configured to obtain output neuron gradient precision S$\nabla_{x(l-1)}$ of an L-1$^{th}$ layer, weight precision S$_w$, and output neuron gradient precision S$\nabla_{x(l)}$ of an L$^{th}$ layer from the storage unit 301, where L is an integer greater than 1, obtain an error transfer gradient update precision A according to the output neuron gradient precision S$\nabla_{x(l-1)}$ of the L-1$^{th}$ layer, the weight precision S$_w$, and the output neuron gradient precision S$\nabla_{x(l)}$ of the L$^{th}$ layer, and when the estimated value A of the error transfer precision is less than a preset precision A$_r$, reduce the output neuron gradient precision S$\nabla_{x(l-1)}$ of the L-1$^{th}$ layer, the weight precision S$_w$, and the output neuron gradient precision S$\nabla_{x(l)}$ of the L$^{th}$ layer.

In a feasible embodiment, the storage unit 301 is further configured to store an output neuron and a weight; the controller unit 302 is configured to obtain a weight, an output neuron of the L-1$^{th}$ layer, and an output neuron of the L$^{th}$ layer from the storage unit 301, and obtain the weight precision S$_w$, the output neuron gradient precision S$\nabla_{x(l-1)}$ of the L−1$^{th}$ layer, and the output neuron gradient precision S∇$_{x(l-1)}$ of the L$^{th}$ layer according to the weight, the output neuron of the L−1$^{th}$ layer, and the output neuron of the L$^{th}$ layer.

In a feasible embodiment, the controller unit 302 obtaining an error transfer gradient update precision A according to the output neuron gradient precision S∇$_{x(l-1)}$ of the L−1$^{th}$ layer, the weight precision S$_w$, and the output neuron gradient precision S∇$_{x(l)}$ of the L$^{th}$ layer includes:

obtaining, by the controller unit, the error transfer gradient update precision A according to a first preset formula, the output neuron gradient precision S∇$_{x(l-1)}$ of the L−1$^{th}$ layer, the weight precision S$_w$, and the output neuron gradient precision S∇$_{x(l)}$ of the L$^{th}$ layer, where the first preset formula is: A=S∇$_{x(l)}$+S$_w$−S∇$_{x(l-1)}$.

The controller unit 302 may preset the preset precision A$_r$ based on experience, or obtain A$_r$ that matches the input parameter by changing the input parameter, or obtain the preset precision A$_r$ through machine learning.

Optionally, the controller unit 302 sets the preset precision A$_r$ according to an amount of output neurons of a previous layer, where the greater the amount of output neurons of the previous layer is, the higher the preset precision A$_r$ is.

It should be noted that since the above output neuron gradient precision of the L$^{th}$ layer S∇$_{x(l)}$=2$^{-s1}$, the controller unit 302 reducing the above output neuron gradient precision S∇$_{x(l)}$ of the L$^{th}$ layer means increasing a bit width s1 of a decimal part of a fixed-point data format representing the output neuron gradient.

Optionally, the controller unit 302 increases the bit width s1 of the decimal part of the fixed-point data format representing the output neuron gradient of the L$^{th}$ layer according to an absolute value of A$_n$−A and a first preset stride N1.

Specifically, for the bit width s1 of the decimal part of the fixed-point data format representing the output neuron gradient, the controller unit 302 adds N1 bits each time, which means the bit width of the decimal part is s1+N1, and further obtains the output neuron gradient precision S∇$_{x(l)}$=2$^{-(s1+N1)}$ of the L$^{th}$ layer.

Optionally, the first preset step size N1 may be 1, 2, 4, 6, 7, 8, or other positive integers.

Optionally, the controller unit increases a bit width of a decimal part of a fixed-point data format representing the output neuron gradient of the L$^{th}$ layer in a double decreasing manner.

For example, if the bit width of the decimal part of the fixed-point data format representing the above output neuron gradient of the L$^{th}$ layer is 4, the output neuron gradient precision of the L$^{th}$ layer is 2-4; and if the bit width is increased in a double increasing manner and the increased bit width of the decimal part of the fixed-point data format representing the output neuron gradient of the L$^{th}$ layer is 8, the reduced output neuron gradient precision of the L$^{th}$ layer is 2$^{-8}$.

In a feasible embodiment, after the controller unit 302 determines an increasing scope b of the bit width of the decimal part of the fixed-point data format representing the output neuron gradient of the L$^{th}$ layer, the controller unit 302 increases the bit width of the decimal part of the fixed-point data format in multiple times. For example, the controller unit 302 increases the bit width of the decimal part of the fixed-point data format twice, the scope of the first increase is b1, the scope of the second increase is b2, and b=b1+b2, where b1 and b2 may be the same or different.

Optionally, when the controller unit reduces the output neuron gradient precision S∇$_{x(l)}$ of the L$^{th}$ layer, the controller unit further increases the bit width of the fixed-point data format representing the output neuron gradient.

Further, the output neuron gradient precision S∇$_{x(l)}$ of the L$^{th}$ layer is reduced by increasing the bit width of the decimal part of the fixed-point data format representing the output neuron gradient of the L$^{th}$ layer. Since the bit width of the fixed-point data format representing the output neuron gradient of the L$^{th}$ layer remains unchanged, if the bit width of the decimal part increases, the bit width of the integer part decreases and data precision represented by the fixed-point data format increases, while a range represented by the fixed-point data format will be reduced. Therefore, after the processor unit 302 increases the output neuron gradient precision S∇$_{x(l)}$ of the L$^{th}$ layer, the controller unit 302 increases the bit width of the fixed-point data format and the bit width of the integer part remains unchanged. In other words, the increase in the bit width of the integer part is the same as the increase in the bit width of the decimal part, then when the bit width of the decimal part changes, the maximum value represented by the fixed-point data format remains unchanged and the precision is also improved.

For example, the bit width of the above fixed-point data format is 9, where the bit width of the integer part is 5 and the bit width of the decimal part is 4. After the controller unit 302 increases the bit width of the decimal part and the bit width of the integer part, the bit width of the decimal part is 8, then the bit width of the integer part is 5. In other words, the bit width of the decimal part increases and the bit width of the integer part remains unchanged.

In a feasible embodiment, after the controller unit 302 increases the output neuron gradient precision S∇$_{x(l)}$ of the L$^{th}$ layer, the controller unit 302 is further configured to:

determine whether the output neuron gradient precision S∇$_{x(l)}$ of the L$^{th}$ layer is greater than required precision, where the required precision is the minimum precision of the output neuron gradient in a multi-layer neural network operation; and when the output neuron gradient precision S∇$_{x(l)}$ of the L$^{th}$ layer is greater than the required precision, increase the bit width of the fixed-point data format representing the output neuron gradient of the L$^{th}$ layer.

It should be noted that the reason why the controller unit 302 increases the output neuron gradient precision S∇$_{x(l)}$ of the L$^{th}$ layer is that the output neuron gradient precision S∇$_{x(l)}$ control is greater than the required precision, that is, the precision does not satisfy the requirement, which may reduce operation precision and affect the precision of the operation result. Therefore, in order to improve the operation precision and avoid affecting the precision of the operation result, it is necessary to reduce the above output neuron gradient precision S∇$_{x(l)}$.

Specifically, after the controller unit 302 reduces the of the output neuron gradient precision S∇$_{x(l)}$ of the L$^{th}$ layer, the controller unit further determines whether the precision satisfies the requirement, that is, determine whether the output neuron gradient precision S∇$_{x(l)}$ is greater than the required precision. When the output neuron gradient precision S∇$_{x(l)}$ is determined to be greater than the required precision, the controller unit further increases the bit width of the fixed-point data format representing the output neuron gradient of the L$^{th}$ layer to improve the output neuron gradient precision S∇$_{x(l)}$.

It should be noted that the controller unit 302 increasing the bit width of the fixed-point data format is specifically increasing the bit width of the integer part of the fixed-point data format.

Further, the controller unit 302 increasing the bit width of the fixed-point data format representing the output neuron gradient of the $L^{th}$ layer includes:

increasing, by the controller unit 302, the bit width of the fixed-point data format representing the output neuron gradient of the $L^{th}$ layer according to a second preset stride N2, where the second preset stride N2 may be 1, 2, 3, 4, 5, 7, 8, or other positive integers.

Specifically, when it is determined to increase the bit width of the fixed-point data format, the controller unit 302 increases the bit width of the fixed-point data format by the second preset stride N2 each time.

In a feasible embodiment, the controller unit 302 increasing the bit width of the fixed-point data format representing the bit width of the fixed-point data format representing the output neuron gradient of the $L-1^{th}$ layer includes:

increasing, by the controller unit 302, the bit width of the fixed-point data format representing the output neuron gradient of the $L-1^{th}$ layer in a double decreasing manner.

For example, if the bit width of the fixed-point data format excluding a sign bit is 8, after the bit width of the fixed-point data format increases in a double increasing manner, the bit width of the fixed-point data format excluding the sign bit is 16; then after the above increasing process is repeated, the bit width of the fixed-point data format excluding the sign bit is 32.

In a feasible embodiment, the storage unit 301 is further configured to store an output neuron of a multi-layer neural network. The controller unit 302 is configured to obtain an output neuron of a multi-layer neural network from the storage unit 301, determine a mean value Y1 of an absolute value of the output neuron of the multi-layer neural network, represent the output neuron of the multi-layer neural network in a fixed-point data format to obtain a fixed-point output neuron, and determine a mean value Y2 of the absolute value of the fixed-point output neuron; if Y1/Y2 is greater then a preset threshold, the controller unit 302 is configured to reduce the output neuron precision and weight precision by any method disclosed in the present disclosure.

In a possible embodiment, the controller unit 302 is configured to obtain output neuron gradient precision and weight precision $S_w$ of two adjacent layers of the multi-layer neural network from the storage unit, determine an estimated value $A^n$ of target error transfer precision according to the output neuron gradient precision and weight precision $S_w$ of two adjacent layers, and when the estimated value $A^n$ of target error transfer precision is less than a preset precision $A_r$, reduce the output neuron gradient precision and weight precision $S_w$ of two adjacent layers; and the operation unit 303 is configured to represent the output neuron gradient of two adjacent layers according to the reduced output neuron gradient precision of two adjacent layers, represent the weight of the multi-layer neural network according to the reduced weight precision $S_w$, and perform subsequent operations.

The output neuron gradient precision of two adjacent layers includes the output neuron gradient precision of the $L-1^{th}$ layer and the output neuron gradient precision of the $L^{th}$ layer. In terms of determining an estimated value of target error transfer precision according to the output neuron gradient precision and weight precision $S_w$ of two adjacent layers, the controller unit 302 is specifically configured to:

if the output neuron gradient precision $S\nabla_{x(l-1)}$ of the $L-1^{th}$ layer includes a plurality of output neuron gradient precisions, obtain a plurality of estimated values of the error transfer precision according to the plurality of output neuron gradient precision of the $L-1^{th}$ layer, the weight precision $S_w$, and the output neuron gradient precision $S\nabla_{x(l)}$ of the $L^{th}$ layer; if the output neuron gradient precision $S\nabla_{x(l)}$ of the $L^{th}$ layer includes a plurality of output neuron gradient precisions, obtain a plurality of estimated values of the error transfer precision according to the plurality of output neuron gradient precision of the $L^{th}$ layer, the weight precision $S_w$, and the output neuron gradient precision $S\nabla_{x(l)}$ of the $L^{th}$ layer; where L is an integer greater than 1; and select the estimated value $A^n$ of target error transfer precision from the plurality of estimated values of the error transfer precision according to a preset strategy.

In a feasible embodiment, the controller unit 302 obtaining a plurality of estimated values of error transfer precision according to the plurality of output neuron gradient precision of the $L-1^{th}$ layer, the weight precision $S_w$, and the output neuron gradient precision $S\nabla_{x(l)}$ of the $L^{th}$ layer includes:

calculating, by the controller unit 302, the plurality of output neuron gradient precision of the $L-1^{th}$ layer, the weight precision $S_w$, and the output neuron gradient precision $S\nabla_{x(l)}$ of the $L^{th}$ layer according to a second preset formula to obtain the plurality of estimated values of error transfer precision, where the second preset formula is: $A^i = S\nabla_{x(l)} + S_w - S^i \nabla_{x(l-1)}$, $A^i$ is the $i^{th}$ estimated value of error transfer precision, and the $S^i\nabla_{x(l-1)}$ is the $i^{th}$ output neuron of the $L-1^{th}$ layer.

Figure 2:
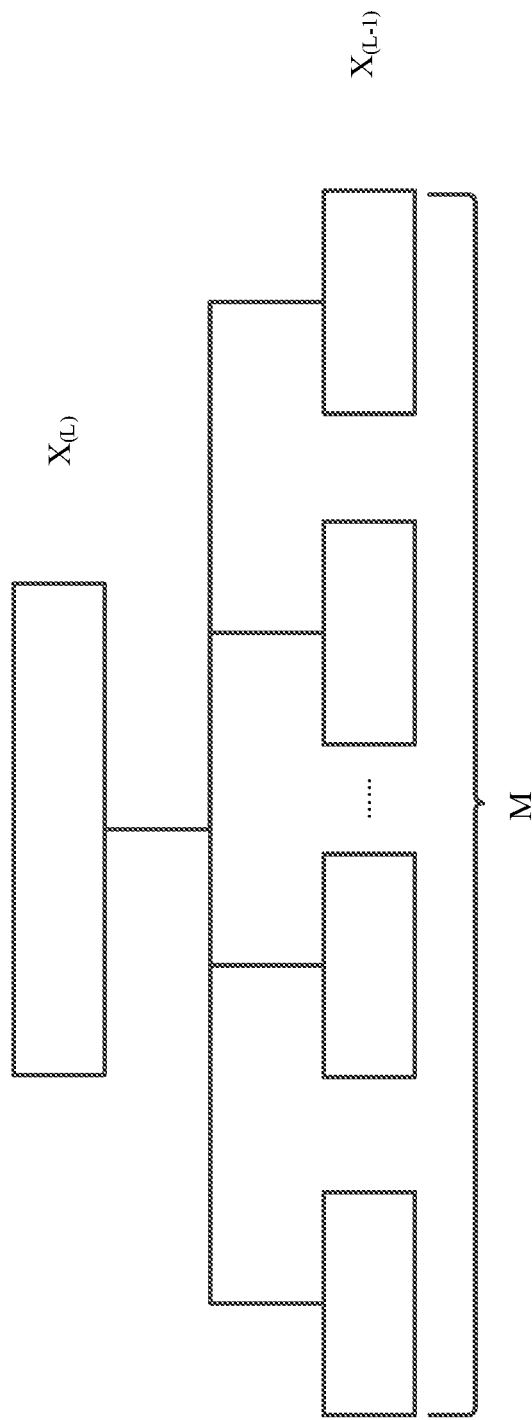
FIG. 2 is a schematic diagram of input neurons of two adjacent layers according to an embodiment of the present disclosure.

As shown in FIG. 2, when the output neuron gradient precision $S\nabla_{x(l-1)}$ of the $L-1^{th}$ layer of the neural network includes M output neuron gradient precision including $S^1\nabla_{x(l-1)}, S^2\nabla_{x(l-1)}, \ldots, S^{M-1}\nabla_{x(l-1)}, S^M\nabla_{x(l-1)}$, the controller unit 302 calculates the M output neuron gradient precision, weight precision, and the output neuron gradient precision $S\nabla_{x(l)}$ of the $L^{th}$ layer according to the second preset formula to obtain M estimated values of error transfer precision including $A^1, A^2, \ldots, A^{M-1}, A^M$, where $$A^1 = S\nabla_{x(l)} + S_w - S^1 \nabla_{x(l-1)},$$
$$A^2 = S\nabla_{x(l)} + S_w - S^2 \nabla_{x(l-1)},$$
$$\ldots\ldots$$
$$A^{M-1} = S\nabla_{x(l)} + S_w - S^{M-1} \nabla_{x(l-1)},$$
$$A^M = S\nabla_{x(l)} + S_w - S^M \nabla_{x(l-1)}.$$

The controller unit 302 selects the estimated value $A^n$ of target error transfer precision from the M estimated values of error transfer precision according to a preset strategy.

Specifically, the above preset strategy includes:

strategy 1: the controller unit 302 selects any one of $\{A^1, A^2, \ldots, A^{M-1}, A^M\}$ as the estimated value $A^n$ of target error transfer precision;

strategy 2: the controller unit 302 selects the minimum value of $\{A^1, A^2, \ldots, A^{M-1}, A^M\}$ as the estimated value $A^n$ of target error transfer precision;

strategy 3: the controller unit 302 selects the maximum value of $\{A^1, A^2, \ldots, A^{M-1}, A^M\}$ as the estimated value $A^n$ of target error transfer precision;

strategy 4: the controller unit 302 calculates a mean value of $\{A^1, A^2, \ldots, A^{M-1}, A^M\}$ as the estimated value $A^n$ of target error transfer precision;

strategy 5: the controller unit 302 calculates a weighted mean value of $\{A^1, A^2, \ldots, A^{M-1}, A^M\}$ according to a preset weight sequence as the estimated value $A''$ of target error transfer precision.

In a feasible embodiment, the controller unit 302 determines a plurality of estimated values of error transfer precision according to the M output neuron gradient precision of the $L-1^{th}$ layer, the weight precision, and the output neuron gradient precision $S\nabla_{x(L)}$ of the $L^{th}$ layer, and determines the estimated value $A''$ of target error transfer precision according to the preset strategy. For the specific process, please refer to related description in the aspect of the controller unit 302 calculating the M output neuron gradient precision, the weight precision, and the output neuron gradient precision $S\nabla_{x(L)}$ of the $L^{th}$ layer to obtain M estimated values of error transfer precision and the estimated value $A''$ of target error transfer precision, which will not be further described herein.

Figure 3:
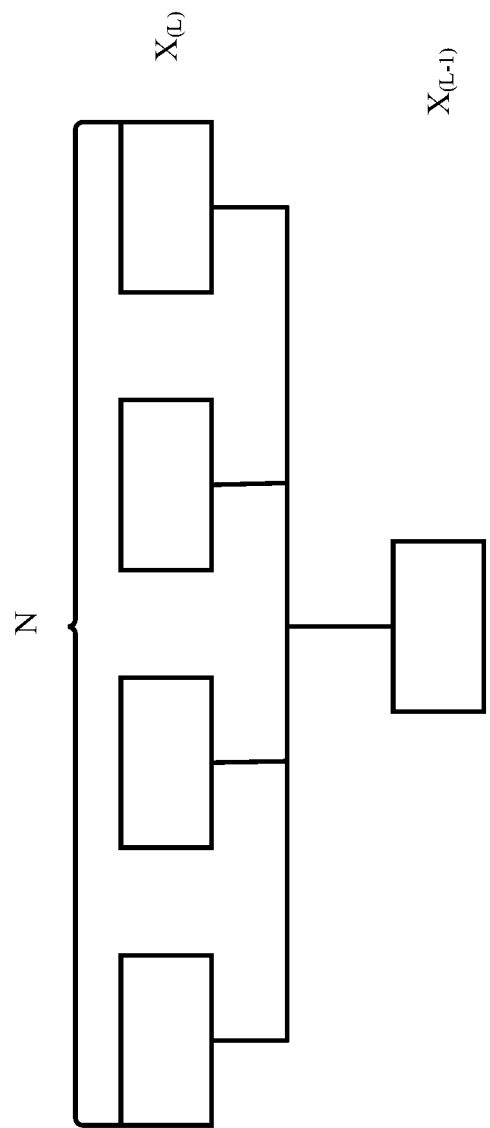
FIG. 3 is another schematic diagram of input neurons of two adjacent layers according to an embodiment of the present disclosure.

As shown in FIG. 3, when the output neuron gradient precision $S\nabla_{x(L)}$ of the $L^{th}$ layer of the neural network includes N output neuron gradient precision including $S^1\nabla_{x(L)}, S^2\nabla_{x(L)}, \ldots, S^{N-1}\nabla_{x(L)}, S^N\nabla_{x(L)}$, the controller unit 302 calculates the N output neuron gradient precision, weight precision, and the output neuron gradient precision $S\nabla_{x(L-1)}$ of the $L-1^{th}$ layer according to a third preset formula to obtain N estimated values of error transfer precision including $A_1, A_2, \ldots, A_{N-1}, A_N$, where $$A_1 = S^1\nabla_{x(L)} + S_w - S\nabla_{x(L-1)},$$
$$A_2 = S^2\nabla_{x(L)} + S_w - S\nabla_{x(L-1)},$$
$$\ldots\ldots$$
$$A_{N-1} = S^{N-1}\nabla_{x(L)} + S_w - S\nabla_{x(L-1)},$$
$$A_N = S^N\nabla_{x(L)} + S_w - S\nabla_{x(L-1)}.$$

The controller unit 302 selects the estimated value $A''$ of target error transfer precision from the N estimated values of error transfer precision according to a preset strategy.

Specifically, the above preset strategy includes:

strategy 1': the controller unit 302 selects any one of $\{A_1, A_2, \ldots, A_{N-1}, A_N\}$ as the estimated value $A''$ of target error transfer precision;

strategy 2': the controller unit 302 selects the minimum value of $\{A_1, A_2, \ldots, A_{N-1}, A_N\}$ as the estimated value $A''$ of target error transfer precision;

strategy 3': the controller unit 302 selects the maximum value of $\{A_1, A_2, \ldots, A_{N-1}, A_N\}$ as the estimated value $A''$ of target error transfer precision;

strategy 4': the controller unit 302 calculates a mean value of $\{A_1, A_2, \ldots, A_{N-1}, A_N\}$ as the estimated value $A''$ of target error transfer precision;

strategy 5': the controller unit 302 calculates a weighted mean value of $\{A_1, A_2, \ldots, A_{N-1}, A_N\}$ according to a preset weight sequence as the estimated value $A''$ of target error transfer precision.

In a feasible embodiment, the controller unit 302 determines a plurality of estimated values of error transfer precision according to part of the N output neuron gradient precision of the $L^{th}$ layer, the weight precision, and the output neuron gradient precision $S\nabla_{x(L-1)}$ of the $L-1^{th}$ layer, and determines the estimated value $A''$ of target error transfer precision according to the preset strategy. For the specific process, please refer to related description in the aspect of the controller unit 302 determining a plurality of estimated values of error transfer precision and the estimated value $A''$ of target error transfer precision according to the N output neuron gradient precision, the weight precision, and the output neuron gradient precision $S\nabla_{x(L-1)}$ of the $L-1^{th}$ layer, which will not be further described herein.

The controller unit 302 determines the estimated value $A''$ of target error transfer precision according to the strategies 3 and 3', and then adjusts the output neuron gradient precision $S\nabla_{x(L-1)}$, the weight precision $S_w$, and the output neuron gradient precision $S\nabla_{x(L)}$ according to the relationship between the estimated value $A''$ of target error transfer precision and the preset precision $A_r$. When the estimated value $A''$ of target error transfer precision is less than the preset precision $A_r$, the controller unit 302 reduces the output neuron gradient precision $S\nabla_{x(L-1)}$, the weight precision $S_w$, and the output neuron gradient precision $S\nabla_{x(L)}$, where M is an integer greater than or equal to 1. The advantage of using the strategies 3 and 3' is to ensure that the precision is high enough for use but does not overflow.

In a feasible embodiment, the controller unit 302 reducing the output neuron gradient precision of two adjacent layers includes: reducing the output neuron gradient precision $S\nabla_{x(L-1)}$ of the $L-1^{th}$ layer and the output neuron gradient precision $S\nabla_{x(L)}$ of the $L^{th}$ layer. If the $L-1^{th}$ layer includes M output neuron gradient precision, the controller unit 302 reduces the M output neuron gradient precision including $S^1\nabla_{x(L-1)}, S^2\nabla_{x(L-1)}, \ldots, S^{M-1}\nabla_{x(L-1)}, S^M\nabla_{x(L-1)}$; and if the $L^{th}$ layer includes N output neuron gradient precision, the controller unit 302 reduces the N output neuron gradient precision including $S^1\nabla_{x(L)}, S^2\nabla_{x(L)}, \ldots, S^{N-1}\nabla_{x(L)}, S^M\nabla_{x(L)}$.

When the controller unit 302 reduces the output neuron gradient precision $S\nabla_{x(L-1)}$ of the $L-1^{th}$ layer, the controller unit 302 further increases the bit width of the current fixed-point data format representing the output neuron gradient of the $L-1^{th}$ layer; if the output neuron gradient precision $S\nabla_{x(L-1)}$ of the $L-1^{th}$ layer includes M output neuron gradient precision, the controller unit 302 increases the bit width of the current fixed-point data format representing each of the M output neuron gradients.

When the controller unit 302 reduces the weight precision $S_w$, the controller unit further increases the bit width of the current fixed-point data format representing the weight.

When the controller unit 302 reduces the output neuron gradient precision $S\nabla_{x(L)}$ of the $L^{th}$ layer, the controller unit 302 further increases the bit width of the current fixed-point data format representing the output neuron gradient of the $L^{th}$ layer; if the output neuron gradient precision $S\nabla_{x(L)}$ of the $L^{th}$ layer includes N output neuron gradient precision, the controller unit 302 increases the bit width of the current fixed-point data format representing each of the N output neuron gradients.

The bit widths of the fixed-point data format representing the input neuron and the weight respectively are a first bit width, and the bit width of the fixed-point data format representing the output neuron gradient is a second bit width.

Optionally, the second bit width is greater than the first bit width.

Further, the second bit width is twice the first bit width, so as to facilitate processing by the electronic computer.

Further, the first bit width is preferably 8 bits, and the second bit width is preferably 16 bits.

In a feasible embodiment, the controller unit 302 increasing a bit width of a current fixed-point data format representing the output neuron gradient of the $L^{th}$ layer includes:

increasing, by the controller unit 302, a bit width of a current fixed-point data format representing the output neuron gradient of the $L^{th}$ layer according to an absolute value of $A''-A_r$ and a third preset stride N3; or increasing, by the controller unit 302, a bit width of a current fixed-point data format representing the output neuron gradient of the $L^{th}$ layer in a double decreasing manner; or increasing, by the controller unit 302, a bit width of a current fixed-point data format representing the output neuron gradient of the $L^{th}$ layer according to a fourth preset stride N4.

Optionally, the third preset stride N3 may be 1, 2, 4, 6, 7, 8, or other positive integers.

In a feasible embodiment, the controller unit increasing a bit width of a current fixed-point data format representing the weight includes:

increasing, by the controller unit, a bit width of a current fixed-point data format representing the weight according to an absolute value of $A''-A_r$ and a fifth preset stride N5; or increasing, by the controller unit, a bit width of a current fixed-point data format representing the weight in a double decreasing manner; or increasing, by the controller unit, a bit width of a current fixed-point data format representing the weight according to a fourth preset stride N4.

In a feasible embodiment, the controller unit 302 increasing a bit width of a current fixed-point data format representing the output neuron gradient of the $L-1^{th}$ layer includes:

increasing, by the controller unit 302, a bit width of a current fixed-point data format representing the output neuron gradient of the $L-1^{th}$ layer according to an absolute value of $A''-A_r$ and a sixth preset stride N6; or increasing, by the controller unit 302, a bit width of a current fixed-point data format representing the output neuron gradient of the $L-1^{th}$ layer in a double decreasing manner; or increasing, by the controller unit 302, a bit width of a current fixed-point data format representing the output neuron gradient of the $L-1^{th}$ layer according to the fourth preset stride N4.

The fourth preset stride N4 is proportional to the preset threshold K. For example, when the fourth preset stride N4 is 8, the value range of the preset threshold K is 0.01-0.5; when the fourth preset stride N4 is 4, the value range of the preset threshold K is 0.0001-0.2.

For the process of the controller unit 302 increasing the bit width of the current fixed-point data format representing the weight and the bit width of the current fixed-point data format representing the output neuron gradient of the $L-1^{th}$ layer, please refer to the related description of the controller unit 302 increasing the bit width of the current fixed-point data format representing the output neuron gradient of the $L^{th}$ layer, which will not be further described herein.

In a feasible embodiment, if Y1/Y2 is less than the preset threshold k, the controller unit 302 does not adjust the output neuron gradient precision of two adjacent layers (including the output neuron gradient precision $SV_{x(l-1)}$ of the $L-1^{th}$ layer and the output neuron gradient precision $SV_{x(l)}$ of the $L^{th}$ layer) and the weight precision $S_w$.

The operation unit 303 is configured to represent the output neuron gradient of the $L-1^{th}$ and the $L^{th}$ layer respectively according to the reduced output neuron gradient precision, represent the weight according to the reduced weight precision, and perform subsequent operations.

After adjusting the output neuron gradient precision $SV_{x(l-1)}$, the weight precision $S_w$, and the output neuron gradient precision $SV_{x(l)}$ according to the above method, the operation unit 303 represents the output neuron of the $L^{th}$ layer, the weight, and the output neuron of the $L-1^{th}$ layer in the fixed-point format according to the adjusted output neuron gradient precision $SV_{x(l-1)}$, the weight precision $S_w$, and the output neuron gradient precision $SV_{x(l)}$ during operation, and then performs subsequent operations.

It should be noted that a frequency at which the controller unit 302 calculates the estimated value $A''$ of target error transfer precision can be flexibly set as required.

The controller unit 302 can adjust the frequency of calculating the estimated value $A''$ of target error transfer precision according to an amount of training iterations in the neural network training process.

Optionally, in the neural network training process, the controller unit 302 recalculates the estimated value $A''$ of target error transfer precision every iteration or every preset amount of iterations, or sets the frequency according to the estimated value $A''$ of target error transfer precision.

Optionally, the controller unit 302 sets the frequency of calculating the estimated value $A''$ of target error transfer precision according to the amount of training iterations in the neural network training process.

It can be seen that in the embodiments of the present disclosure, during the neural network operation, the output neuron gradient precision $SV_{x(l-1)}$ of the $L-1^{th}$ layer, the weight precision $S_w$, and the output neuron gradient precision $SV_{x(l)}$ of the $L^{th}$ layer are dynamically adjusted to satisfy operation requirements, reduce errors of the operation result and operation overhead, and save operation resources.

Figure 4:
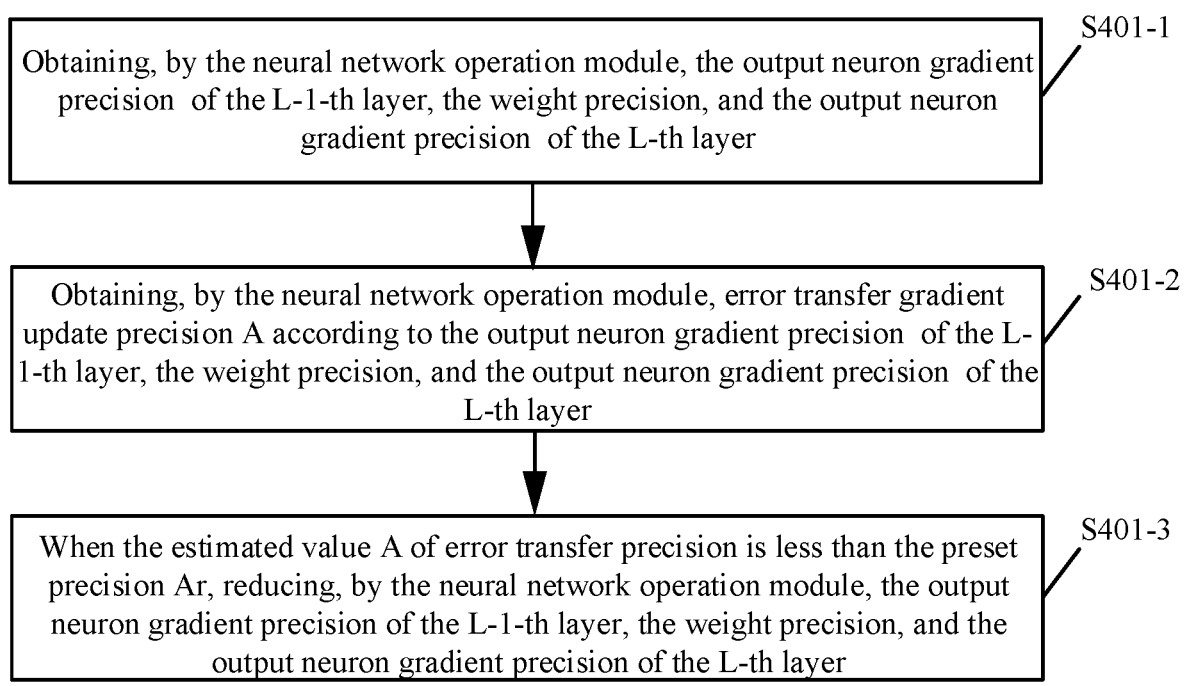
FIG. 4 is a flowchart of a neural network operation method according to an embodiment of the present disclosure.

FIG. 4 is a flowchart of a neural network operation method according to an embodiment of the present disclosure. The neural network operation method is used to perform a multi-layer neural network operation. The method shown in FIG. 4 includes:

S401-1, obtaining, by the neural network operation module, the output neuron gradient precision $SV_{x(l-1)}$ of the $L-1^{th}$ layer, the weight precision $S_w$, and the output neuron gradient precision $SV_{x(l)}$ of the $L^{th}$ layer, where values of the output neuron gradient precision $SV_{x(l-1)}$ of the $L-1^{th}$ layer, the weight precision $S_w$, and the output neuron gradient precision $SV_{x(l)}$ of the $L^{th}$ layer may be equal, partially equal, or unequal.

The above neural network is a multi-layer neural network, and the above output neuron gradient precision $SV_{x(l)}$ is the output neuron gradient precision of any layer except the first layer of the multi-layer neural network; the above output neuron gradient precision $SV_{x(l-1)}$ is the output neuron gradient precision of any layer of the above multi-layer neural network.

In a feasible embodiment, the neural network operation module obtains the weight, the output neurons of the $L-1^{th}$ layer and the $L^{th}$ layer of the neural network, and then obtains the output neuron gradient precision $SV_{x(l)}$, the weight precision $S_w$, and the output neuron gradient precision $SV_{x(l-1)}$ according to the weight and the output neurons of the $L-1^{th}$ layer and the $L^{th}$ layer.

The method further includes: S401-2, obtaining, by the neural network operation module, an error transfer gradient update precision A according to the output neuron gradient precision $SV_{x(l-1)}$ of the $L-1^{th}$ layer, the weight precision $S_w$, and the output neuron gradient precision $SV_{x(l)}$ of the $L^{th}$ layer.

Specifically, the neural network operation module calculates the output neuron gradient precision $SV_{x(l)}$, the weight precision $S_w$, and the output neuron gradient precision $SV_{x(l-1)}$ according to a first preset formula to obtain the estimated value A of error transfer precision, where the first preset formula is: $A=SV_{x(l)}+S_w-SV_{x(l-1)}$;

S401-3, when the estimated value A of error transfer precision is less than the preset precision $A_r$, reducing, by the neural network operation module, the output neuron gradient precision of the L-1$^{th}$ layer, the weight precision, and the output neuron gradient precision of the L$^{th}$ layer, where the preset precision $A_r$ may be preset based on experience or obtained through machine learning, or the $A_r$ that matches the input parameter may be obtained by changing the input parameter.

Optionally, the preset precision $A_r$ is preset by the neural network operation module according to an amount of output neurons of a previous layer, where the greater the amount of output neurons of the previous layer is, the higher the preset precision $A_r$ is.

It should be noted that since the above output neuron gradient precision of the L$^{th}$ layer $SV_{x(l)}=2^{-s1}$, the neural network operation module reducing the above output neuron gradient precision $SV_{x(l)}$ of the L$^{th}$ layer means increasing a bit width s1 of a decimal part of a fixed-point data format representing the output neuron gradient.

Optionally, the neural network operation module increases the bit width s1 of the decimal part of the fixed-point data format representing the output neuron gradient of the L$^{th}$ layer according to an absolute value of $A_n-A$ and a first preset stride N1.

Specifically, for the bit width s1 of the decimal part of the fixed-point data format representing the output neuron gradient, the controller unit 302 adds N1 bits each time, which means the bit width of the decimal part is s1+N1, and further obtains the output neuron gradient precision $SV_{x(l)}=2^{-(s1+N1)}$ of the L$^{th}$ layer.

Optionally, the first preset step size N1 may be 1, 2, 4, 6, 7, 8, or other positive integers.

Optionally, the neural network operation module increases a bit width of a decimal part of a fixed-point data format representing the output neuron gradient of the L$^{th}$ layer in a double increasing manner.

For example, if the bit width of the decimal part of the fixed-point data format representing the above output neuron gradient of the L$^{th}$ layer is 4, the output neuron gradient precision of the L$^{th}$ layer is $2^{-4}$; and if the bit width is increased in a double increasing manner and the increased bit width of the decimal part of the fixed-point data format representing the output neuron gradient of the L$^{th}$ layer is 8, the increased output neuron gradient precision of the L$^{th}$ layer is $2^{-8}$.

In a feasible embodiment, after the neural network operation module determines an increasing scope b of the bit width of the decimal part of the fixed-point data format representing the output neuron gradient of the L$^{th}$ layer, the neural network operation module increases the bit width of the decimal part of the fixed-point data format in multiple times. For example, the neural network operation module increases the bit width of the decimal part of the fixed-point data format twice, the scope of the first increase is b1, the scope of the second increase is b2, and b=b1+b2, where b1 and b2 may be the same or different.

Optionally, when the neural network operation module reduces the output neuron gradient precision $SV_{x(l)}$ of the L$^{th}$ layer, the neural network operation module further increases the bit width of the fixed-point data format representing the output neuron gradient.

Further, the output neuron gradient precision $SV_{x(l)}$ of the L$^{th}$ layer is reduced by increasing the bit width of the decimal part of the fixed-point data format representing the output neuron gradient of the L$^{th}$ layer. Since the bit width of the fixed-point data format representing the output neuron gradient of the L$^{th}$ layer remains unchanged, if the bit width of the decimal part increases, the bit width of the integer part decreases and data precision represented by the fixed-point data format increases, while a range represented by the fixed-point data format will be reduced. Therefore, after the processor unit 302 increases the output neuron gradient precision $SV_{x(l)}$ of the L$^{th}$ layer, the controller unit 302 increases the bit width of the fixed-point data format and the bit width of the integer part remains unchanged. In other words, the increase in the bit width of the integer part is the same as the increase in the bit width of the decimal part, then when the bit width of the decimal part changes, the maximum value represented by the fixed-point data format remains unchanged and the precision is also improved.

For example, the bit width of the above fixed-point data format is 9, where the bit width of the integer part is 5 and the bit width of the decimal part is 4. After the neural network operation module increases the bit width of the decimal part and the bit width of the integer part, the bit width of the decimal part is 8, then the bit width of the integer part is 5. In other words, the bit width of the decimal part increases and the bit width of the integer part remains unchanged.

In a feasible embodiment, after the neural network operation module increases the output neuron gradient precision $SV_{x(l)}$ of the L$^{th}$ layer, the neural network operation module is further configured to:

determine whether the output neuron gradient precision $SV_{x(l)}$ of the L$^{th}$ layer is greater than required precision, where the required precision is the minimum precision of the output neuron gradient in a multi-layer neural network operation; and when the output neuron gradient precision $SV_{x(l)}$ of the L$^{th}$ layer is greater than the required precision, increase the bit width of the fixed-point data format representing the output neuron gradient of the L$^{th}$ layer.

It should be noted that the reason why the controller unit 302 increases the output neuron gradient precision $SV_{x(l)}$ of the L$^{th}$ layer is that the output neuron gradient precision $SV_{x(l)}$ control is greater than the required precision, that is, the precision does not satisfy the requirement, which may reduce operation precision and affect the precision of the operation result. Therefore, in order to improve the operation precision and avoid affecting the precision of the operation result, it is necessary to reduce the above output neuron gradient precision $SV_{x(l)}$.

Specifically, after the controller unit 302 reduces the of the output neuron gradient precision $SV_{x(l)}$ of the L$^{th}$ layer, the controller unit further determines whether the precision satisfies the requirement, that is, determine whether the output neuron gradient precision $SV_{x(l)}$ is greater than the required precision. When the output neuron gradient precision $SV_{x(l)}$ is determined to be greater than the required precision, the controller unit further increases the bit width of the fixed-point data format representing the output neuron gradient of the L$^{th}$ layer to improve the output neuron gradient precision $SV_{x(l)}$.

It should be noted that the controller unit 302 increasing the bit width of the fixed-point data format is specifically increasing the bit width of the integer part of the fixed-point data format.

Further, the neural network operation module increasing a bit width of a decimal part of a fixed-point data format representing the output neuron gradient of the $L^{th}$ layer includes:

increasing, by the neural network operation module, the bit width of the fixed-point data format representing the output neuron gradient of the $L^{th}$ layer according to a second preset stride N2, where the second preset stride N2 may be 1, 2, 3, 4, 5, 7, 8, or other positive integers.

Specifically, when it is determined to increase the bit width of the fixed-point data format, the neural network operation module increases the bit width of the fixed-point data format by the second preset stride N2 each time.

In a feasible embodiment, the controller unit 302 increasing the bit width of the fixed-point data format representing the bit width of the fixed-point data format representing the output neuron gradient of the L−1$^{th}$ layer includes:

increasing, by the neural network operation module, the bit width of the fixed-point data format representing the output neuron gradient of the $L^{th}$ layer in a double decreasing manner.

For example, if the bit width of the fixed-point data format excluding a sign bit is 8, after the bit width of the fixed-point data format increases in a double increasing manner, the bit width of the fixed-point data format excluding the sign bit is 16; then after the above increasing process is repeated, the bit width of the fixed-point data format excluding the sign bit is 32.

In a feasible embodiment, the neural network operation module is configured to obtain an output neuron of a multi-layer neural network, determine a mean value Y1 of an absolute value of the output neuron of the multi-layer neural network, represent the output neuron of the multi-layer neural network in a fixed-point data format to obtain a fixed-point output neuron, and determine a mean value Y2 of the absolute value of the fixed-point output neuron; if Y1/Y2 is greater then a preset threshold, the neural network operation module is configured to reduce the output neuron precision and weight precision by any method disclosed in the present disclosure.

In a possible embodiment, the neural network operation module is configured to obtain output neuron gradient precision and weight precision $S_w$ of two adjacent layers of the multi-layer neural network from the storage unit, determine an estimated value A″ of target error transfer precision according to the output neuron gradient precision and weight precision $S_w$ of two adjacent layers, and when the estimated value A″ of target error transfer precision is less than a preset precision $A_r$, reduce the output neuron gradient precision and weight precision $S_w$ of two adjacent layers; and the operation unit 303 is configured to represent the output neuron gradient of two adjacent layers according to the reduced output neuron gradient precision of two adjacent layers, represent the weight of the multi-layer neural network according to the reduced weight precision $S_w$, and perform subsequent operations.

The output neuron gradient precision of two adjacent layers includes the output neuron gradient precision of the L−1$^{th}$ layer and the output neuron gradient precision of the $L^{th}$ layer. In terms of determining an estimated value of target error transfer precision according to the output neuron gradient precision and weight precision $S_w$ of two adjacent layers, the neural network operation module is specifically configured to:

if the output neuron gradient precision $S\nabla_{x(l-1)}$ of the L−1$^{th}$ layer includes a plurality of output neuron gradient precision, obtain a plurality of estimated values of error transfer precision according to the plurality of output neuron gradient precision of the L−1$^{th}$ layer, the weight precision $S_w$, and the output neuron gradient precision $S\nabla_{x(l)}$ of the $L^{th}$ layer; if the output neuron gradient precision $S\nabla_{x(l)}$ of the $L^{th}$ layer includes a plurality of output neuron gradient precision, obtain a plurality of estimated values of error transfer precision according to the plurality of output neuron gradient precision of the $L^{th}$ layer, the weight precision $S_w$, and the output neuron gradient precision $S\nabla_{x(l)}$ of the $L^{th}$ layer; where L is an integer greater than 1; and select the estimated value A″ of target error transfer precision from the plurality of estimated values of error transfer precision according to a preset strategy.

In a feasible embodiment, the neural network operation module obtaining a plurality of estimated values of error transfer precision according to the plurality of output neuron gradient precision of the L−1$^{th}$ layer, the weight precision $S_w$, and the output neuron gradient precision $S\nabla_{x(l)}$ of the $L^{th}$ layer includes:

calculating, by the controller unit, the plurality of output neuron gradient precision of the L−1$^{th}$ layer, the weight precision $S_w$, and the output neuron gradient precision $S\nabla_{x(l)}$ of the $L^{th}$ layer according to a second preset formula to obtain the plurality of estimated values of error transfer precision, where the second preset formula is: $A^i = S\nabla_{x(l)} + S_w - S^i\nabla_{x(l-1)}$, $A^i$ is the $i^{th}$ estimated value of error transfer precision, and the $S^i\nabla_{x(l-1)}$ is the $i^{th}$ output neuron of the L−1$^{th}$ layer.

As shown in FIG. 2, when the output neuron gradient precision $S\nabla_{x(l-1)}$ of the L−1$^{th}$ layer of the neural network includes M output neuron gradient precision including $S^1\nabla_{x(l-1)}, S^2\nabla_{x(l-1)}, \ldots, S^{M-1}\nabla_{x(l-1)}, S^M\nabla_{x(l-1)}$, the neural network operation module calculates the M output neuron gradient precision, weight precision, and the output neuron gradient precision $S\nabla_{x(l)}$ of the $L^{th}$ layer according to the second preset formula to obtain M estimated values of error transfer precision including $A^1, A^2, \ldots, A^{M-1}, A^M$, where $$A^1 = S\nabla_{x(l)} + S_w - S^1\nabla_{x(l-1)},$$

$$A^2 = S\nabla_{x(l)} + S_w - S^2\nabla_{x(l-1)},$$

$$\ldots\ldots$$

$$A^{M-1} = S\nabla_{x(l)} + S_w - S^{M-1}\nabla_{x(l-1)},$$

$$A^M = S\nabla_{x(l)} + S_w - S^M\nabla_{x(l-1)}.$$

The neural network operation module selects the estimated value A″ of target error transfer precision from the M estimated values of error transfer precision according to a preset strategy.

Specifically, the above preset strategy includes:

strategy 1: the neural network operation module selects any one of $\{A^1, A^2, \ldots, A^{M-1}, A^M\}$ as the estimated value A″ of target error transfer precision;

strategy 2: the neural network operation module selects the minimum value of $\{A1, A2, \ldots, A^{M-1}, A^M\}$ as the estimated value A″ of target error transfer precision;

strategy 3: the neural network operation module selects the maximum value of $\{A1, A2, \ldots, A^{M-1}, A^M\}$ as the estimated value A″ of target error transfer precision;

strategy 4: the neural network operation module calculates a mean value of $\{A1, A2, \ldots, A^{M-1}, A^M\}$ as the estimated value A″ of target error transfer precision;

strategy 5: the neural network operation module calculates a weighted mean value of $\{A1, A2, \ldots, A^{M-1}, A^M\}$ according to a preset weight sequence as the estimated value $A''$ of target error transfer precision.

In a feasible embodiment, the neural network operation module determines a plurality of estimated values of error transfer precision according to the M output neuron gradient precision of the L-1$^{th}$ layer, the weight precision, and the output neuron gradient precision $S\nabla_{x(l)}$ of the L$^{th}$ layer, and determines the estimated value $A''$ of target error transfer precision according to the preset strategy. For the specific process, please refer to related description in the aspect of the neural network operation module calculating the M output neuron gradient precision, the weight precision, and the output neuron gradient precision $S\nabla_{x(l)}$ of the L$^{th}$ layer to obtain M estimated values of error transfer precision and the estimated value $A''$ of target error transfer precision, which will not be further described herein.

As shown in FIG. 3, when the output neuron gradient precision $S\nabla_{x(l)}$ of the L$^{th}$ layer of the neural network includes N output neuron gradient precision including $S^1\nabla_{x(l)}, S^2\nabla_{x(l)}, \ldots, S^{N-1}\nabla_{x(l)}, S^N\nabla_{x(l)}$, the neural network operation module calculates the N output neuron gradient precision, weight precision, and the output neuron gradient precision $S\nabla_{x(l-1)}$ of the L-1$^{th}$ layer according to a third preset formula to obtain N estimated values of error transfer precision including $A_1, A_2, \ldots, A_{N-1}, A_N$, where $$A_1 = S^1\nabla_{x(l)} + S_w - S\nabla_{x(l-1)},$$
$$A_2 = S^2\nabla_{x(l)} + S_w - S\nabla_{x(l-1)},$$
$$\ldots\ldots$$
$$A_{N-1} = S^{N-1}\nabla_{x(l)} + S_w - S\nabla_{x(l-1)},$$
$$A_N = S^N\nabla_{x(l)} + S_w - S\nabla_{x(l-1)}.$$

The neural network operation module selects the estimated value $A''$ of target error transfer precision from the N estimated values of error transfer precision according to a preset strategy.

Specifically, the above preset strategy includes:
strategy 1': the neural network operation module selects any one of $\{A_1, A_2, \ldots, A_{N-1}, A_N\}$ as the estimated value $A''$ of target error transfer precision;
strategy 2': the neural network operation module selects the minimum value of $\{A1, A2, \ldots, A_{N-1}, A_N\}$ as the estimated value $A''$ of target error transfer precision;
strategy 3': the neural network operation module selects the maximum value of $\{A1, A2, \ldots, A_{N-1}, A_N\}$ as the estimated value $A''$ of target error transfer precision;
strategy 4': the neural network operation module calculates a mean value of $\{A1, A2, \ldots, A_{N-1}, A_N\}$ as the estimated value $A''$ of target error transfer precision;
strategy 5': the neural network operation module calculates a weighted mean value of $\{A1, A2, \ldots, A_{N-1}, A_N\}$ according to a preset weight sequence as the estimated value $A''$ of target error transfer precision.

In a feasible embodiment, the neural network operation module determines a plurality of estimated values of error transfer precision according to the N output neuron gradient precision of the L$^{th}$ layer, the weight precision, and the output neuron gradient precision $S\nabla_{x(l-1)}$ of the L-1$^{th}$ layer, and determines the estimated value $A''$ of target error transfer precision according to the preset strategy. For the specific process, please refer to related description in the aspect of the neural network operation module determining a plurality of estimated values of error transfer precision and the estimated value $A''$ of target error transfer precision according to part of the N output neuron gradient precision, the weight precision, and the output neuron gradient precision $S\nabla_{x(l-1)}$ of the L$^{th}$ layer, which will not be further described herein.

The neural network operation module determines the estimated value $A''$ of target error transfer precision according to the strategies 3 and 3', and then adjusts the output neuron gradient precision $S\nabla_{x(l-1)}$, the weight precision $S_w$, and the output neuron gradient precision $S\nabla_{x(l)}$ according to the relationship between the estimated value $A''$ of target error transfer precision and the preset precision $A_r$. When the estimated value $A''$ of target error transfer precision is less than the preset precision $A_r$, the neural network operation module reduces the output neuron gradient precision $S\nabla_{x(l-1)}$, the weight precision $S_w$, and the output neuron gradient precision $S\nabla_{x(l)}$, where M is an integer greater than or equal to 1. The advantage of using the strategies 3 and 3' is to ensure that the precision is high enough for use but does not overflow.

It should be noted that the neural network operation module reducing the output neuron gradient precision of two adjacent layers includes: reducing the output neuron gradient precision $S\nabla_{x(l-1)}$ of the L-1$^{th}$ layer and the output neuron gradient precision $S\nabla_{x(l)}$ of the L$^{th}$ layer. If the L-1$^{th}$ layer includes M output neuron gradient precision, the neural network operation module reduces the M output neuron gradient precision including $S^1\nabla_{x(l-1)}, S^2\nabla_{x(l-1)}, \ldots, S^{M-1}\nabla_{x(l-1)}, S^M\nabla_{x(l-1)}$; and if the L$^{th}$ layer includes N output neuron gradient precision, the controller unit 302 reduces the N output neuron gradient precision including $S^1\nabla_{x(l)}, S^2\nabla_{x(l)}, \ldots, S^{N-1}\nabla_{x(l)}, S^N\nabla_{x(l)}$.

When the neural network operation module reduces the output neuron gradient precision $S\nabla_{x(l-1)}$ of the L-1$^{th}$ layer, the neural network operation module further increases the bit width of the current fixed-point data format representing the output neuron gradient of the L-1$^{th}$ layer; if the output neuron gradient precision $S\nabla_{x(l-1)}$ of the L-1$^{th}$ layer includes M output neuron gradient precision, the neural network operation module increases the bit width of the current fixed-point data format representing each of the M output neuron gradients.

When the neural network operation module reduces the weight precision $S_w$, the neural network operation module further increases the bit width of the current fixed-point data format representing the weight;
when the neural network operation module reduces the output neuron gradient precision $S\nabla_{x(l)}$ of the L$^{th}$ layer, the neural network operation module further increases the bit width of the current fixed-point data format representing the output neuron gradient of the L$^{th}$ layer; if the output neuron gradient precision $S\nabla_{x(l)}$ of the L$^{th}$ layer includes N output neuron gradient precision, the neural network operation module increases the bit width of the current fixed-point data format representing each of the N output neuron gradients.

The bit widths of the fixed-point data format representing the input neuron and the weight respectively are the first bit width, and the bit width of the fixed-point data format representing the output neuron gradient is the second bit width.

Optionally, the second bit width is greater than the first bit width.

Further, the second bit width is twice the first bit width, so as to facilitate processing by the electronic computer.

Further, the first bit width is preferably 8 bits, and the second bit width is preferably 16 bits.

In a feasible embodiment, the neural network operation module increasing the bit width of the fixed-point data format representing the output neuron gradient of the $L^{th}$ layer includes:

increasing a bit width of a current fixed-point data format representing the output neuron gradient of the $L^{th}$ layer according to an absolute value of $A''-A_r$ and a third preset stride N3; or increasing a bit width of a current fixed-point data format representing the output neuron gradient of the $L^{th}$ layer in a double decreasing manner; or increasing a bit width of a current fixed-point data format representing the output neuron gradient of the $L^{th}$ layer according to a fourth preset stride N4.

Optionally, the third preset stride N3 may be 1, 2, 4, 6, 7, 8, or other positive integers.

In a feasible embodiment, the neural network operation module increasing the bit width of the fixed-point data format representing the weight includes:

increasing a bit width of a current fixed-point data format representing the weight according to the absolute value of $A''-A_r$ and the fifth preset stride N5; or increasing a bit width of a current fixed-point data format representing the weight in a double decreasing manner; or increasing a bit width of a current fixed-point data format representing the weight according to the fourth preset stride N4.

In a feasible embodiment, the neural network operation module increasing the bit width of the fixed-point data format representing the output neuron gradient of the $L-1^{th}$ layer includes:

increasing a bit width of a current fixed-point data format representing the output neuron gradient of the $L-1^{th}$ layer according to the absolute value of $A''-A_r$ and the sixth preset stride N6; or increasing a bit width of a current fixed-point data format representing the output neuron gradient of the $L-1^{th}$ layer in a double decreasing manner; or increasing a bit width of a current fixed-point data format representing the output neuron gradient of the $L-1^{th}$ layer according to the fourth preset stride N4.

The above fourth preset stride N4 is proportional to the preset threshold K. For example, when the fourth preset stride N4 is 8, the value range of the preset threshold K is 0.01-0.5; when the fourth preset stride N4 is 4, the value range of the preset threshold K is 0.0001-0.2.

For the process of the neural network operation module increasing the bit width of the current fixed-point data format representing the weight and the bit width of the current fixed-point data format representing the output neuron gradient of the $L-1^{th}$ layer, please refer to the related description of the neural network operation module increasing the bit width of the current fixed-point data format representing the output neuron gradient of the $L^{th}$ layer, which will not be further described herein.

In a feasible embodiment, if Y1/Y2 is less than the preset threshold k, the neural network operation module does not adjust the output neuron gradient precision of two adjacent layers (including the output neuron gradient precision $S\nabla_{x(I-1)}$ of the $L-1^{th}$ layer and the output neuron gradient precision $S\nabla_{x(I)}$ of the $L^{th}$ layer) and the weight precision $S_w$.

The neural network operation module is configured to represent the output neuron gradient of the $L-1^{th}$ and the $L^{th}$ layer respectively according to the reduced output neuron gradient precision, represent the weight according to the reduced weight precision, and perform subsequent operations.

After adjusting the output neuron gradient precision $S\nabla_{x(I-1)}$, the weight precision $S_w$, and the output neuron gradient precision $S\nabla_{x(I)}$ according to the above method, the neural network operation module represents the output neuron of the $L^{th}$ layer, the weight, and the output neuron of the $L-1^{th}$ layer in the fixed-point format according to the adjusted output neuron gradient precision $S\nabla_{x(I-1)}$, the weight precision $S_w$, and the output neuron gradient precision $S\nabla_{x(I)}$ during operation, and then performs subsequent operations.

It should be noted that a frequency at which the neural network operation module calculates the estimated value $A''$ of target error transfer precision can be flexibly set as required.

The neural network operation module can adjust the frequency of calculating the estimated value $A''$ of target error transfer precision according to an amount of training iterations in the neural network training process.

Optionally, in the neural network training process, the neural network operation module recalculates the estimated value $A''$ of target error transfer precision every iteration or every preset amount of iterations, or sets the frequency according to the estimated value $A''$ of target error transfer precision.

Optionally, the neural network operation module sets the frequency of calculating the estimated value $A''$ of target error transfer precision according to the amount of training iterations in the neural network training process.

It can be seen that in the embodiments of the present disclosure, during the neural network operation, the output neuron gradient precision $S\nabla_{x(I-1)}$ of the $L-1^{th}$ layer, the weight precision $S_w$, and the output neuron gradient precision $S\nabla_{x(I)}$ of the $L^{th}$ layer are dynamically adjusted to satisfy operation requirements, reduce errors of the operation result and operation overhead, and save operation resources.

Those of ordinary skill in the art can understand that the entire or part of the flow in the methods as stated in the examples may be carried out by instructing related hardware by a computer program. The computer program may be stored in a computer readable storage medium. When the program is executed, the program may include the flow of each method as stated in the embodiments above. The storage medium may be a magnetic disk, an optical disc, a Read-Only Memory (ROM), or a Random Access Memory (RAM), etc.

What is disclosed above is only a preferred embodiment of the present disclosure, and cannot be used to limit the scope of claims of the present disclosure. Those of ordinary skill in the art can understand that all or part of the processes of the above embodiments as well as equivalent changes required by the claims of the present disclosure are still within the scope of the present disclosure.

What is claimed is:

1. A neural network operation module configured to perform a multi-layer neural network operation, comprising
a memory configured to store:
a precision of a weight $S_w$ of an $L-1^{th}$ layer of a multi-layer neural network;
a precision of a weight $S_w$ of an $L^{th}$ layer of the multi-layer neural network; and
a precision of an output neuron gradient $S\nabla_{x(I-1)}$ of the $L-1^{th}$ layer; and a precision of an output neuron gradient $S\nabla_{x(L)}$ of the $L^{th}$ layer;
circuitry configured to:
  obtain the precision of the output neuron gradient $S\nabla_{x(L-1)}$ of the $L-1^{th}$ layer, the precision of the output neuron gradient $S\nabla_{x(L)}$ of the $L^{th}$ layer, the precision of the weight $S_w$ of the $L-1^{th}$ layer and the precision of the weight $S_w$ of the $L^{th}$ layer from the memory;
  determine an estimated value $A''$ of target error transfer precision according to the precision of the output neuron gradient $S\nabla_{x(L-1)}$ of the $L-1^{th}$ layer, the precision of the output neuron gradient $S\nabla_{x(L)}$ of the $L^{th}$ layer, the precision of the weight $S_w$ of the $L-1^{th}$ layer, and the precision of the weight $S_w$ of the $L_{th}$ layer;
  when the estimated value $A''$ of the target error transfer precision is greater than a preset precision $A_r$, increase the precision of the output neuron gradient $S\nabla_{x(L-1)}$ of the $L-1^{th}$ layer, the precision of the output neuron gradient $S\nabla_{x(L)}$ of the $L^{th}$ layer, the precision of the weight $S_w$ of the $L-1^{th}$ layer, and the precision of the weight $S_w$ of the $L^{th}$ layer;
  represent an output neuron gradient of the $L-1^{th}$ layer and an the output neuron gradient of the $L^{th}$ layer according to the increased precision of the output neuron gradient $S\nabla_{x(L-1)}$ of the $L-1^{th}$ layer and the precision of the output neuron gradient $S\nabla_{x(L)}$ of the $L^{th}$ layer respectively;
  represent a weight of the multi-layer neural network according to the increased precision of the weight $S_w$ of the $L-1^{th}$ layer and the precision of the weight $S_w$ of the $L^{th}$ layer; and
  perform subsequent operations.

2. The module of claim 1, wherein the determination of the estimated value of the target error transfer precision according to the precision of the output neuron gradient $S\nabla_{x(L-1)}$ of the $L-1^{th}$ layer, the precision of the output neuron gradient $S\nabla_{x(L)}$ of the $L^{th}$ layer, the precision of the weight $S_w$ of the $L^{th}$ layer, and the precision of the weight $S_w$ of the $L^{th}$ layer includes:
  if the precision of the output neuron gradient $S\nabla_{x(L-1)}$ of the $L-1^{th}$ layer includes a plurality of precisions of the output neuron gradient, obtain a plurality of estimated values of error transfer precision according to the plurality of precisions of the output neuron gradient, the precision of the weight $S_w$ of the $L-1^{th}$ layer, the precision of the weight $S_w$ of the $L^{th}$ layer, and the precision of the output neuron gradient $S\nabla_{x(L)}$ of the $L^{th}$ layer,
  if the precision of the output neuron gradient $S\nabla_{x(L)}$ of the $L^{th}$ layer includes a plurality of precisions of the output neuron gradient, obtain the plurality of estimated values of the error transfer precision according to the plurality of precisions of the output neuron gradient of the $L^{th}$ layer, the precision of the weight $S_w$ of the $L-1^{th}$ layer, the precision of the weight $S_w$ of the $L^{th}$ layer, and the precision of the output neuron gradient $S\nabla_{x(L)}$ of the $L^{th}$ layer, wherein L is an integer greater than 1; and
  select the estimated value $A''$ of the target error transfer precision from the plurality of estimated values of error transfer precision according to a preset strategy.

3. The module of claim 2, wherein the obtaining of the plurality of estimated values of error transfer precision according to the plurality of precisions of the output neuron gradient of the $L-1^{th}$ layer, the precision of the weight $S_w$ of the $L-1^{th}$ layer, the precision of the weight $S_w$ of the $L^{th}$ layer, and the precision of the output neuron gradient $S\nabla_{x(L)}$ of the $L^{th}$ layer includes:
  calculating, by the circuitry, the plurality of precisions of the output neuron gradient of the $L-1^{th}$ layer, the precision of the weight $S_w$ of the $L^{th}$ layer, the precision of the weight $S_w$ of the $L-1^{th}$ layer, and the precision of the output neuron gradient $S\nabla_{x(L)}$ of the $L^{th}$ layer according to a first preset formula to obtain the plurality of estimated values of error transfer precision, wherein the first preset formula is: $A^i = S\nabla_{x(L)} + S_w - S^i\nabla_{x(L-1)}$, $A^i$ is an $i^{th}$ estimated value of error transfer precision, and the $S^i\nabla_{x(L-1)}$ is an $i^{th}$ output neuron of the $L-1^{th}$ layer.

4. The module of claim 2, wherein the obtaining of the plurality of estimated values of the error transfer precision according to the precision of the output neuron gradient $S\nabla_{x(L-1)}$ of the $L-1^{th}$ layer, the precision of the weight $S_w$ of the $L-1^{th}$ layer, the precision of the weight $S_w$ of the $L^{th}$ layer, and a plurality of precisions of the output neuron gradient of the $L^{th}$ layer includes:
  calculating, by the circuitry, the precision of the output neuron gradient $S\nabla_{x(L-1)}$ of the $L-1^{th}$ layer, the precision of the weight $S_w$ of the $L-1^{th}$ layer, the precision of the weight $S_w$ of the $L^{th}$ layer, and the plurality of precisions of the output neuron gradient of the $L^{th}$ layer according to a second preset formula to obtain the plurality of estimated values of error transfer precision, wherein
  the second preset formula is: $A_i = S^i\nabla_{x(L)} + S_w - S\nabla_{x(L-1)}$, the $A^i$ is an $i^{th}$ estimated value of error transfer precision, and the $S^i\nabla_{x(L-1)}$ is an $i^{th}$ output neuron of the $L-1^{th}$ layer.

5. The module of claim 2, wherein the selecting of the estimated value $A''$ of the target error transfer precision from the plurality of estimated values of error transfer precision according to the preset strategy includes:
  selecting any one of the plurality of estimated values of error transfer precision as the estimated value $A''$ of target error transfer precision; or
  selecting a maximum value from the plurality of estimated values of error transfer precision as the estimated value $A''$ of target error transfer precision; or
  selecting a minimum value from the plurality of estimated values of error transfer precision as the estimated value $A''$ of target error transfer precision; or
  calculating a mean value of the plurality of estimated values of error transfer precision according to a preset weight as the estimated value $A''$ of target error transfer precision; or
  calculating a weighted mean value of the plurality of estimated values of error transfer precision according to the preset weight as the estimated value $A''$ of target error transfer precision.

6. The module of claim 2, wherein when the precision of the output neuron gradient $S\nabla_{x(L-1)}$ of the $L-1^{th}$ layer is increased, the circuitry is further configured to reduce a bit width of a current fixed-point data format representing the output neuron gradient of the $L-1^{th}$ layer,
  when the precision of the weight $S_w$ of the $L-1^{th}$ layer and the precision of the weight $S_w$ of the $L^{th}$ layer is increased, the circuitry is further configured to reduce a bit width of a current fixed-point data format representing the weight; and
  when the precision of the output neuron gradient $S\nabla_{x(L)}$ of the $L^{th}$ layer is increased, the circuitry is further configured to reduce a bit width of a current fixed-point data format representing the output neuron gradient of the $L^{th}$ layer.

7. The module of claim 6, wherein reducing of a bit width of a fixed-point data format representing the output neuron gradient of the $L^{th}$ layer includes:
   reducing, by the circuitry, the bit width of the current fixed-point data format representing the output neuron gradient of the $L^{th}$ layer according to an absolute value of $A''-A_r$ and a first preset stride N1; or
   reducing, by the circuitry, the bit width of the current fixed-point data format representing the output neuron gradient of the $L^{th}$ layer in a double decreasing manner; or
   reducing, by the circuitry, the bit width of the current fixed-point data format representing the output neuron gradient of the $L^{th}$ layer according to a second preset stride N2.

8. The module of claim 1, wherein the circuitry is further configured to:
   preset the preset precision $A_r$ according to an empirical value; or
   obtain the preset precision $A_r$ which matches an input parameter by changing the input parameter; or
   obtain the preset precision $A_r$ through machine learning; or
   set the preset precision $A_r$ according to an amount of output neurons of the $L-1^{th}$ layer, wherein the greater the amount of output neurons of the $L-1^{th}$ layer is, the higher the preset precision $A_r$ is.

9. The module of claim 1, wherein
   the memory is further configured to store an output neuron of the multi-layer neural network,
   the circuitry is configured to:
      obtain the output neuron of the multi-layer neural network from the memory;
      determine a mean value Y1 of an absolute value of the output neuron;
      represent the output neuron in a fixed-point data format to obtain a fixed-point output neuron; and
      determine a mean value Y2 of the absolute value of the fixed-point output neuron, if Y1/Y2 is greater than a preset threshold K.

10. A neural network operation method used to perform a multi-layer neural network operation, comprising:
    obtaining, by circuitry, a precision of an output neuron gradient $S\nabla_{x(l-1)}$ of an $L-1^{th}$ layer of a multi-layer neural network, a precision of an output neuron gradient $S\nabla_{x(l)}$ of an $L^{th}$ layer of the multi-layer neural network a precision of a weight $S_w$, of the $L-1^{th}$ layer and a precision of a weight $S_w$ of the $L^{th}$ layer;
    determining, by the circuitry, an estimated value $A''$ of target error transfer precision according to the precision of the output neuron gradient $S\nabla_{x(l-1)}$ of the $L-1^{th}$ layer, the precision of the output neuron gradient $S\nabla_{x(l)}$ of the $L^{th}$ layer, the precision of the weight $S_w$ of the $L-1^{th}$ layer, and the precision of the weight $S_w$ of the $L_{th}$ layer;
    when the estimated value $A''$ of target error transfer precision is greater than a preset precision $A_r$, increasing the precision of the output neuron gradient $S\nabla_{x(l-1)}$ of the $L-1^{th}$ layer, the precision of the output neuron gradient $S\nabla_{x(l)}$ of the $L^{th}$ layer, the precision of the weight $S_w$ of the $L-1^{th}$ layer, and the precision of the weight $S_w$ of the $L^{th}$ layer;
    representing, by the circuitry, an output neuron gradient of the $L-1^{th}$ layer and an output neuron gradient of the $L^{th}$ layer according to the increased precision of the output neuron gradient $S\nabla_{x(l-1)}$ of the $L-1^{th}$ layer and the precision of the output neuron gradient $S\nabla_{x(l)}$ of the $L^{th}$ layer respectively;
    representing, by the circuitry, a weight of the multi-layer neural network according to the increased precision of the weight $S_w$ of the $L-1^{th}$ layer and the precision of the weight $S_w$ of the $L^{th}$ layer; and
    performing, by the circuitry, subsequent operations.

11. The method of claim 10, wherein the determining of the estimated value of the target error transfer precision according to the precision of the output neuron gradient $S\nabla_{x(l-1)}$ of the $L-1^{th}$ layer, the precision of the output neuron gradient $S\nabla_{x(l)}$ of the $L^{th}$ layer, the precision of the weight $S_w$ of the $L-1^{th}$ layer, and the precision of the weight $S_w$ of the $L^{th}$ layer includes:
    if the precision of the output neuron gradient $S\nabla_{x(l-1)}$ of the $L-1^{th}$ layer includes a plurality of precisions of the output neuron gradient, obtaining a plurality of estimated values of error transfer precision according to the plurality of precisions of the output neuron gradient, the precision of the weight $S_w$ of the $L-1^{th}$ layer, the precision of the weight $S_w$ of the $L^{th}$ layer, and the precision of the output neuron gradient $S\nabla_{x(l)}$ of the $L^{th}$ layer,
    if the precision of the output neuron gradient $S\nabla_{x(l)}$ of the $L^{th}$ layer includes a plurality of precisions of the output neuron gradient, obtain the plurality of estimated values of the error transfer precision according to the plurality of precisions of the output neuron gradient of the $L^{th}$ layer, the precision of the weight $S_w$ of the $L-1^{th}$ layer, the precision of the weight $S_w$ of the $L^{th}$ layer, and the precision of the output neuron gradient $S\nabla_{x(l)}$ of the $L^{th}$ layer, wherein L is an integer greater than 1; and
    selecting the estimated value $A''$ of the target error transfer precision from the plurality of estimated values of error transfer precision according to a preset strategy.

12. The method of claim 11, wherein the obtaining of the plurality of estimated values of error transfer precision according to the plurality of precisions of the output neuron gradient of the $L-1^{th}$ layer, the precision of the weight $S_w$ of the $L-1^{th}$ layer, the precision of the weight $S_w$ of the $L^{th}$ layer, and the precision of the output neuron gradient $S\nabla_{x(l)}$ of the $L^{th}$ layer includes:
    calculating the plurality of precisions of the output neuron gradient of the $L-1^{th}$ layer, the precision of the weight $S_w$ of the $L^{th}$ layer, the precision of the weight $S_w$ of the $L-1^{th}$ layer, and the precision of the output neuron gradient $S\nabla_{x(l)}$ of the $L^{th}$ layer according to a first preset formula to obtain the plurality of estimated values of error transfer precision, wherein
    the first preset formula is: $A^i = S\nabla_{x(l)} + S_w - S^i \nabla_{x(l-1)}$, $A^i$ is an $i^{th}$ estimated value of error transfer-precision, and the $S^i \nabla_{x(l-1)}$ is an $i^{th}$ output neuron of the $L-1^{th}$ layer.

13. The method of claim 11, wherein the obtaining of the plurality of estimated values of the error transfer precision according to the precision of the output neuron gradient $S\nabla_{x(l-1)}$ of the $L-1^{th}$ layer, the precision of the weight $S_w$ of the $L-1^{th}$ layer, the precision of the weight Sw of the $L^{th}$ layer, and a plurality of precisions of output neuron gradient of the $L^{th}$ layer includes:
    calculating the precision of the output neuron gradient $S\nabla_{x(l-1)}$ of the $L-1^{th}$ layer, the precision of the weight $S_w$ of the $L-1^{th}$ layer, the precision of the weight $S_w$ of the $L^{th}$ layer, and the plurality of precisions of output neuron gradient of the $L^{th}$ layer according to a second preset formula to obtain the plurality of estimated values of error transfer precision, wherein the second preset formula is: $A_i = S^i \nabla_{x(l)} + S_w - S \nabla_{x(l-1)}$, the $A^i$ is an $i^{th}$ estimated value of error transfer precision, and the $S^i \nabla_{x(l-1)}$ is an $i^{th}$ output neuron of the L-1$^{th}$ layer.

14. The method of claim 11, wherein the selecting of the estimated value $A''$ of the target error transfer precision from the plurality of estimated values of error transfer precision according to the preset strategy includes:

selecting any one of the plurality of estimated values of error transfer precision as the estimated value $A''$ of target error transfer precision; or selecting a maximum value from the plurality of estimated values of error transfer precision as the estimated value $A''$ of target error transfer precision; or selecting a minimum value from the plurality of estimated values of error transfer precision as the estimated value $A''$ of target error transfer precision; or calculating a mean value of the plurality of estimated values of error transfer precision according to a preset weight as the estimated value $A''$ of target error transfer precision; or calculating a weighted mean value of the plurality of estimated values of error transfer precision according to the preset weight as the estimated value $A''$ of target error transfer precision.

15. The method of claim 11, further comprising:

when the circuitry increases the precision of the output neuron gradient $S \nabla_{x(l-1)}$ of the L-1$^{th}$ layer, reducing a bit width of a current fixed-point data format representing the output neuron gradient $S \nabla_{x(l-1)}$ of the L-1$^{th}$ layer, when the circuitry increases the precision of the weight $S_w$ of the L-1$^{th}$ layer and the precision of the weight $S_w$ of the L$^{th}$ layer, reducing a bit width of a current fixed-point data format representing the weight; and when the circuitry increases the precision of the output neuron gradient $S \nabla_{x(l)}$ of the L$^{th}$ layer, reducing a bit width of a current fixed-point data format representing the output neuron gradient of the L$^{th}$ layer.

16. The method of claim 15, wherein reducing of a bit width of a fixed-point data format representing the output neuron gradient of the L$^{th}$ layer includes:

reducing the bit width of the current fixed-point data format representing the output neuron gradient of the L$^{th}$ layer according to an absolute value of $A''-A_r$ and a first preset stride N1; or reducing the bit width of the current fixed-point data format representing the output neuron gradient of the L$^{th}$ layer in a double decreasing manner, or reducing the bit width of a current fixed-point data format representing the output neuron gradient of the L$^{th}$ layer according to a second preset stride N2.

17. The method of claim 10, further comprising:

presetting the preset precision $A_r$ according to an empirical value; or obtaining the preset precision $A_r$ which matches an input parameter by changing the input parameter; or obtaining the preset precision $A_r$ through machine learning; or setting the preset precision $A_r$ according to an amount of output neurons of the L-1$^{th}$ layer, wherein the greater the amount of output neurons of the L-1$^{th}$ layer is, the higher the preset precision $A_r$ is.

18. The method of claim 10, further comprising:

obtaining an output neuron of the multi-layer neural network;

determining a mean value Y1 of an absolute value of the output neuron;

representing the output neuron in a fixed-point data format to obtain a fixed-point output neuron; and determining a mean value Y2 of the absolute value of the fixed-point output neuron, and if Y1/Y2 is greater than a preset threshold K.

* * * * *